United States Patent
Zettsu et al.

(10) Patent No.: US 10,747,449 B2
(45) Date of Patent: Aug. 18, 2020

(54) REDUCTION OF POWER USE DURING ADDRESS TRANSLATION VIA SELECTIVE REFRESH OPERATIONS

(71) Applicant: Toshiba Memory Corporation, Minato-ku, Tokyo (JP)

(72) Inventors: Tatsuya Zettsu, Yokohama Kanagawa (JP); Katsuhiko Ueki, Tokyo (JP); Yoshihisa Kojima, Kawasaki Kanagawa (JP); Hiroshi Yao, Yokohama Kanagawa (JP); Kenichiro Yoshii, Tokyo (JP); Ikuo Magaki, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 301 days.

(21) Appl. No.: 14/641,099

(22) Filed: Mar. 6, 2015

(65) Prior Publication Data
US 2016/0034221 A1 Feb. 4, 2016

Related U.S. Application Data

(60) Provisional application No. 62/031,185, filed on Jul. 31, 2014.

(51) Int. Cl.
*G06F 3/06* (2006.01)
(52) U.S. Cl.
CPC .......... *G06F 3/0625* (2013.01); *G06F 3/0634* (2013.01); *G06F 3/0659* (2013.01); *G06F 3/0679* (2013.01); *Y02D 10/154* (2018.01)

(58) Field of Classification Search
None
See application file for complete search history.

(56) References Cited

U.S. PATENT DOCUMENTS

| | | | |
|---|---|---|---|
| 7,333,363 B2 | 2/2008 | Nakai et al. | |
| 8,200,885 B2 | 6/2012 | Sartore | |
| 8,473,760 B2 | 6/2013 | Takeyama et al. | |
| 2009/0198952 A1* | 8/2009 | Khmelnitsky | G06F 12/0246 711/206 |
| 2011/0238928 A1 | 9/2011 | Abe et al. | |
| 2013/0166932 A1 | 6/2013 | Larovici et al. | |
| 2013/0290759 A1 | 10/2013 | Kumar et al. | |

(Continued)

FOREIGN PATENT DOCUMENTS

| | | |
|---|---|---|
| JP | 04-259989 | 9/1992 |
| JP | 2006-302466 | 11/2006 |

(Continued)

*Primary Examiner* — Gary W. Cygiel
(74) *Attorney, Agent, or Firm* — White & Case LLP

(57) ABSTRACT

According to one embodiment, a memory system is provided with a nonvolatile memory, a controller, a volatile memory and an address translation table. The address translation table includes a high level and a plurality of low levels. The high level indicates positions in the nonvolatile memory in which the low levels are recorded. The low levels indicate positions in the nonvolatile memory in which data is recorded. The controller holds the high level of the address translation table in the first area of the volatile memory, and shuts off the supply of power to the second area of the volatile memory based on a transition from a normal-power state to a low-power state.

42 Claims, 13 Drawing Sheets

(56) References Cited

U.S. PATENT DOCUMENTS

| | | | |
|---|---|---|---|
| 2014/0181558 A1* | 6/2014 | Taha | G06F 1/3206 |
| | | | 713/323 |
| 2014/0195837 A1* | 7/2014 | Park | G06F 13/1668 |
| | | | 713/323 |

FOREIGN PATENT DOCUMENTS

| | | |
|---|---|---|
| JP | 2011-192212 | 9/2011 |
| JP | 2011-203905 | 10/2011 |

\* cited by examiner

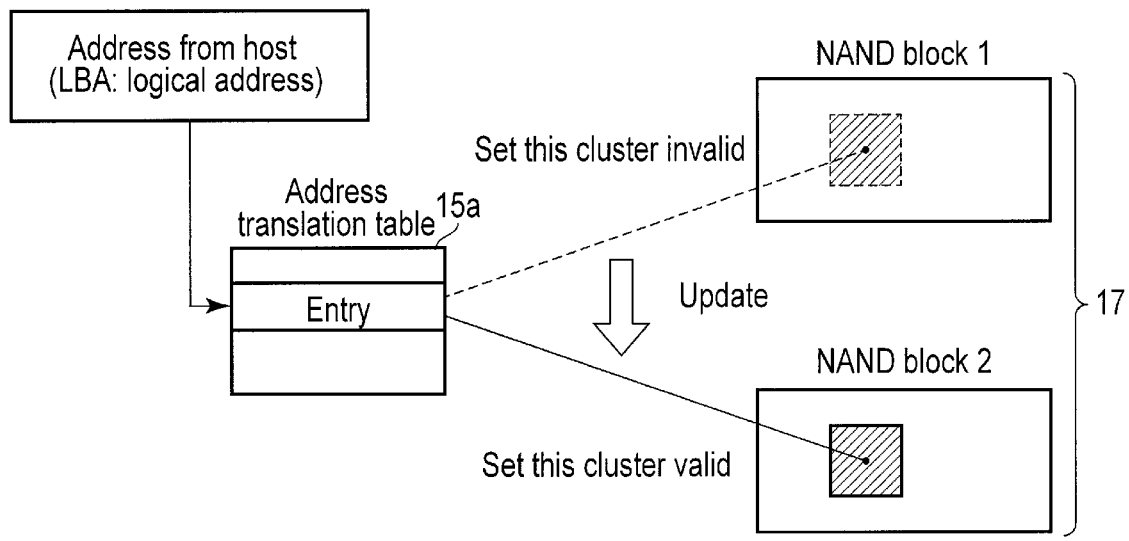
F I G. 5
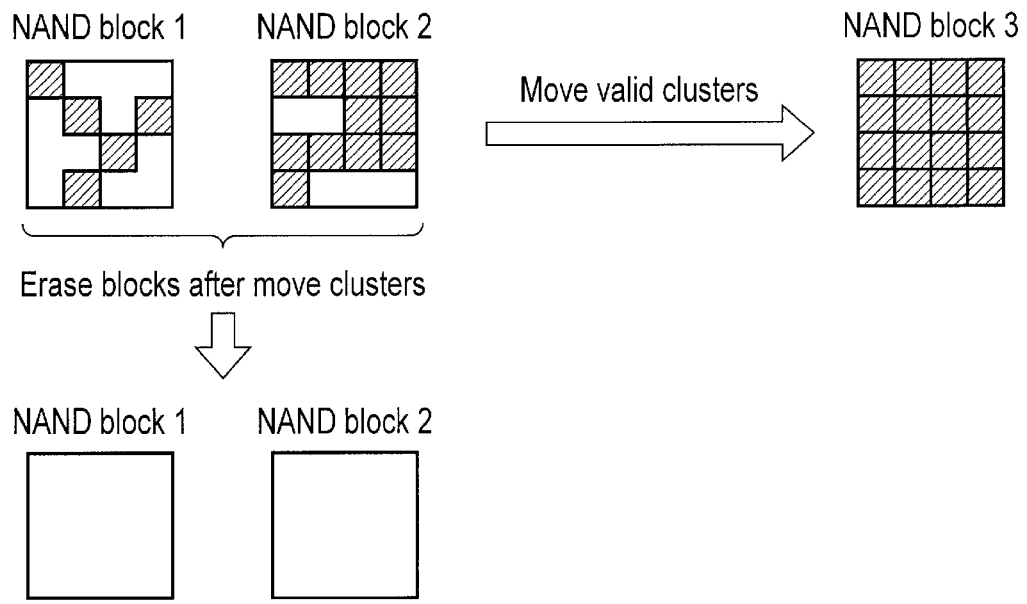
F I G. 6

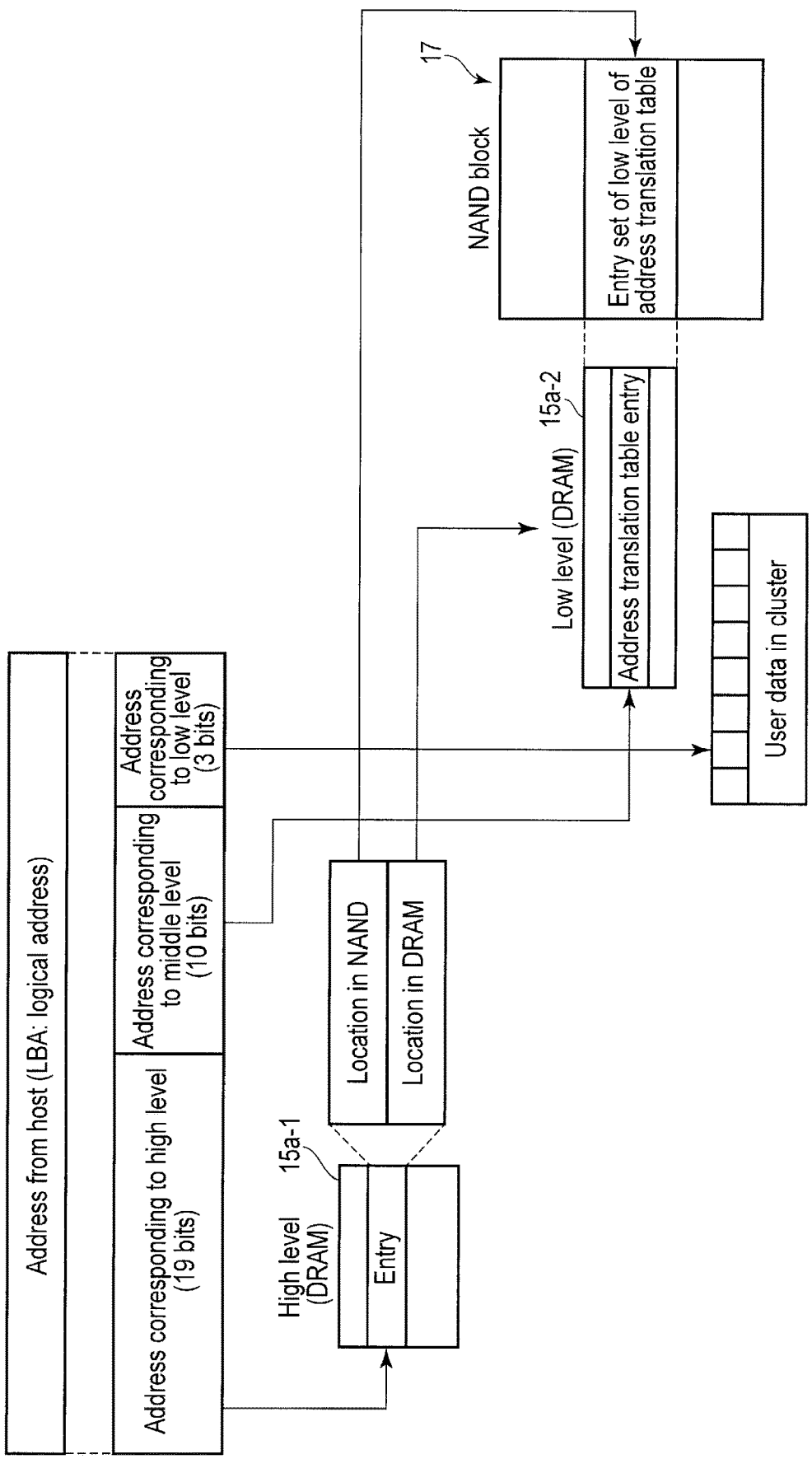
F I G. 7

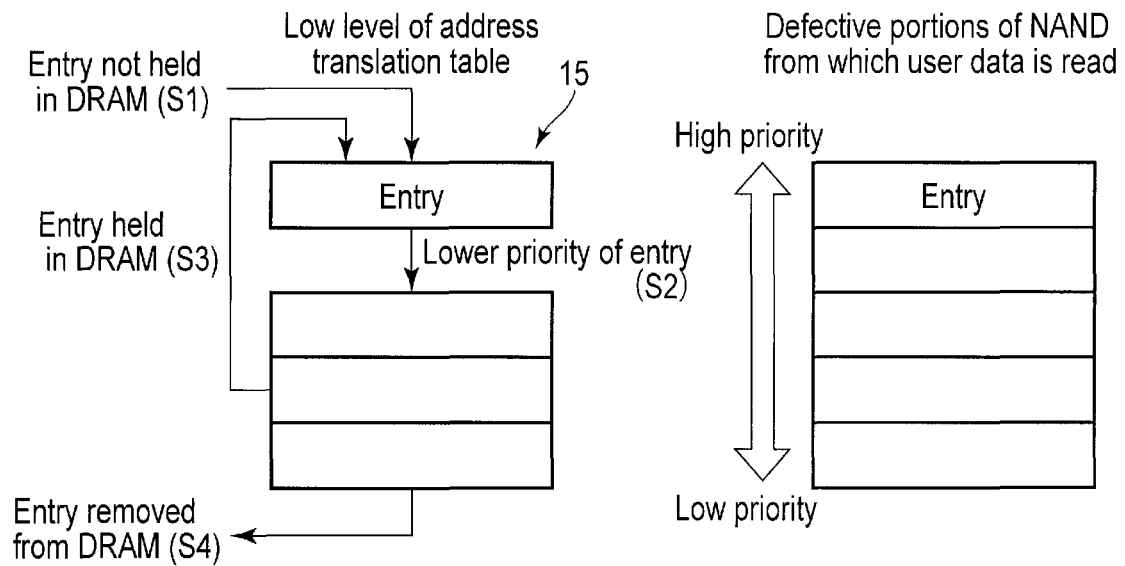
F I G. 11
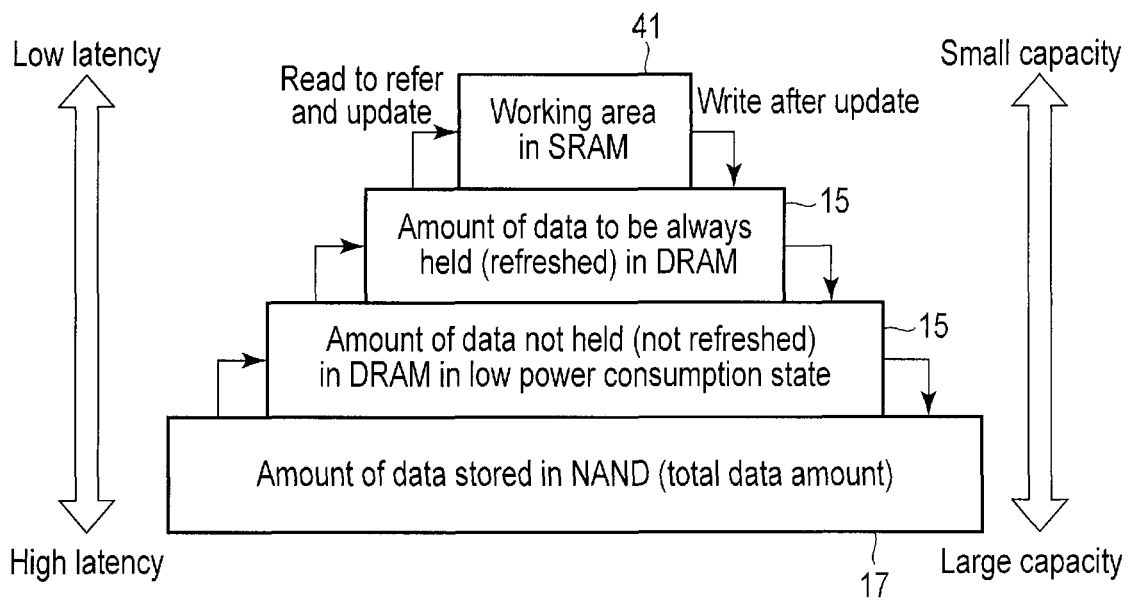
F I G. 12

REDUCTION OF POWER USE DURING ADDRESS TRANSLATION VIA SELECTIVE REFRESH OPERATIONS

CROSS-REFERENCE TO RELATED APPLICATIONS

This application claims the benefit of U.S. Provisional Application No. 62/031,185, filed Jul. 31, 2014, the entire contents of which are incorporated herein by reference.

FIELD

Embodiments described herein relate generally to a memory system applied to, for example, a solid state drive (SSD), and a control method thereof.

BACKGROUND

SSDs as external storage devices to be connected to, for example, a computer and using a NAND flash memory as a nonvolatile memory have recently been developed.

In the SSDs, when there is no data read or data write from or to a host for a predetermined period of time, it is necessary to reduce their power consumption.

BRIEF DESCRIPTION OF THE DRAWINGS

FIG. 5 is a view showing an address translation table example used when user data is overwritten;

FIG. 6 is a view showing an example of a garbage collection;

FIG. 7 is a view showing the correspondence relationship between a logical address and the address translation table;

FIG. 11 shows an example of the low level of an address translation table;

FIG. 12 schematically shows a memory structure obtained when a static RAM is added;

DETAILED DESCRIPTION

Figure 1:
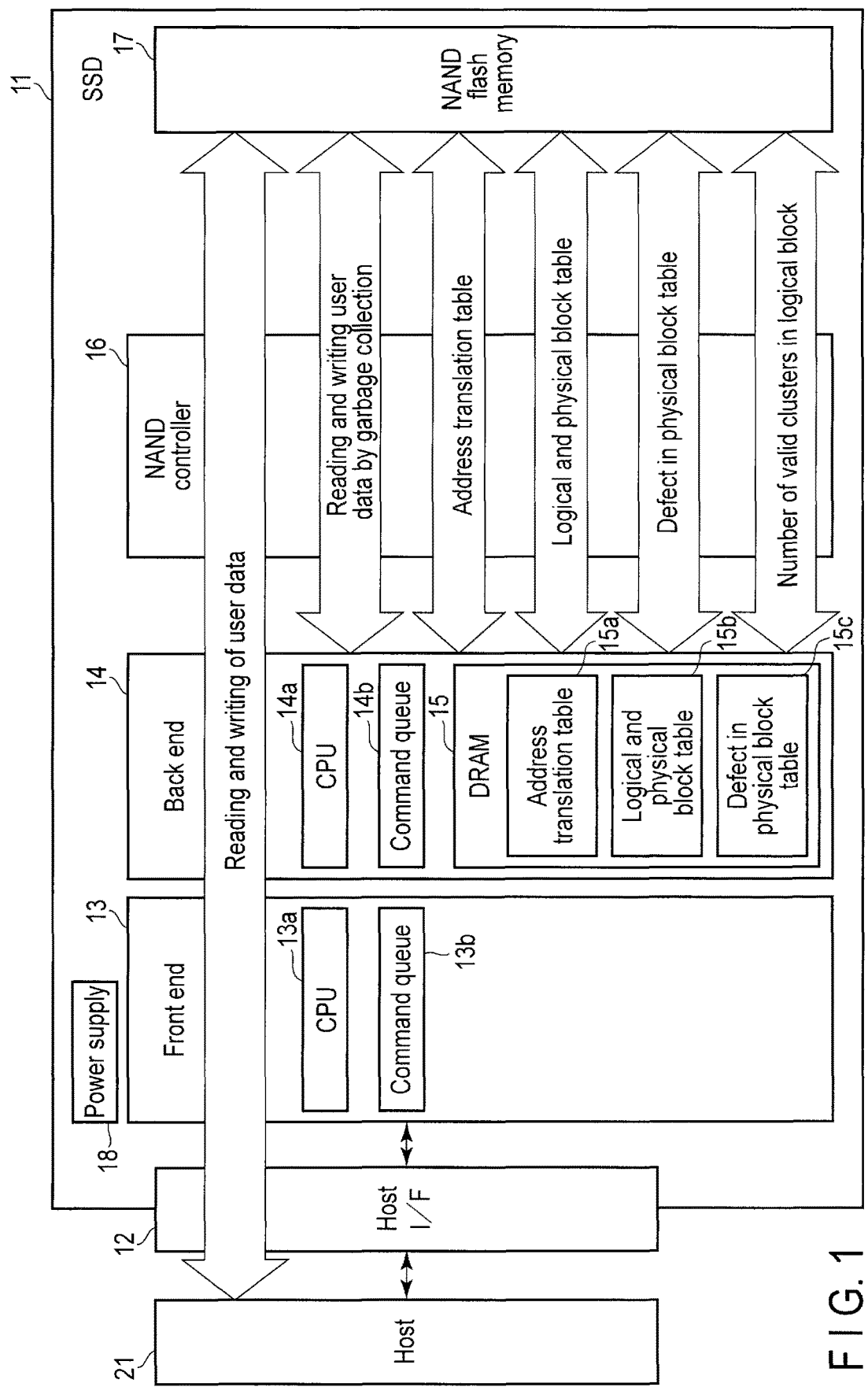
FIG. 1 is a schematic block diagram showing the configuration of an SSD to which an embodiment is applied.

In general, according to one embodiment, there is provided a memory system comprising a nonvolatile memory, a controller, a volatile memory, and an address translation table. The nonvolatile memory has a plurality of physical blocks and each of the physical blocks is an erasure unit. The controller translates a logical address supplied from a host into a physical address to access the nonvolatile memory. The volatile memory includes a first area continuously supplied with power, and a second area to which supply of power can be shut off. The address translation table translates the logical address into the physical address. The address translation table includes a high level and a plurality of low levels. The high level indicates positions in the nonvolatile memory in which the low levels are recorded, and the low levels indicate positions in the nonvolatile memory in which data is recorded. The controller holds the high level of the address translation table in the first area of the volatile memory, and shuts off supply of power to the second area of the volatile memory based on a transition from a normal-power state to a low-power state.

An SSD as a memory system comprises a NAND flash memory (hereinafter referred to simply as a "NAND") as a nonvolatile memory, and a dynamic random access memory (DRAM) as a volatile memory. The DRAM stores, for example, an address translation table. The address translation table shows the relationship between logical addresses supplied from a host and physical addresses (block addresses+page addresses in blocks) indicating the positions of data stored in the NAND. The address translation table, for example, is normally stored in the NAND, and is read from the NAND and expanded in the DRAM on boot. The address translation table, for example, in the DRAM is saved in the NAND regularly or at the time of power off.

Further, in the SSD, when there is no data read from a host or no data write to the host, for a predetermined period of time, it is necessary to reduce its power consumption. In the conventional SSDs, however, all data stored in the DRAM is saved in the NAND or none of the data is saved in the NAND. If none of the data is saved, it is necessary to continue the supply of power to the DRAM so as not to lose the data in the DRAM, which makes it difficult to reduce the power consumption of the DRAM.

In contrast, if all data in the DRAM is saved in the NAND, the supply of power to the DRAM is shut off. Thereby the power consumption can be reduced. However, if a request to read or write data from or to the host occurs after the power is shut off, it is necessary to read, for example, an address translation table and the like from the NAND and to expand it in the DRAM. This makes it difficult to quickly respond to the request from the host.

Further, in the NAND, if a bit (or bits), a write to which is impossible, (hereinafter, referred to as a defective portion(s)) has occurred due to, for example, a manufacturing process, it is necessary to skip over the defective portion and to access it. Thus, the address assigned to the defective portion is managed in a table and stored in the NAND. On boot, the address assigned to the defective portion must be also expanded in the DRAM. Because of this, it is difficult to make a quick response to a request from the host.

As described above, the NAND and DRAM store, as well as user data, a large amount of data other than the user data, and when the user data is accessed, the other data must be also accessed.

Furthermore, when the power supply shuts down unexpectedly, the backend writes data to the NAND which data is not written and not perpetuated at the time. This keeps integrity of the user data that the host writes. In this power loss protection procedure, if the back end starts to access data other than user data after noticing power loss, the procedure takes longer time. This requires much capacity for batteries and capacitors and is an obstacle to reduce SSD device size.

In view of the above, in an embodiment described below, at the time of reducing the power consumption, consumption of power is reduced to enable quick responses to the host, by leaving data for realizing quick response to the host in a volatile memory supplied with power, and at the same time by shutting off the supply of power to the other volatile memories.

Embodiment

An embodiment will be described with reference to the accompanying drawings. Through the drawings, like reference numbers denote like elements.

FIG. 1 schematically shows an SSD 11 to which the embodiment is applied.

As shown in FIG. 1, the SSD 11 comprises, for example, a host interface (host I/F) 12, a front end 13, a back end 14, a DRAM 15 contained in, for example, the back end 14, a NAND controller 16, a NAND 17 and a power supply 18.

The host interface (hereinafter, the host I/F) 12 comprises a serial attached SCSI (SAS) interface, a serial advanced technology attachment (SATA) interface, or the like. The SSD 11 is connected to a host 21, such as a personal computer, via the host I/F 12, and functions as an external memory for the host 21.

When issuing a read command or a write command as a host IF command to the SSD 11, the host 21 issues a command including a logical block address (LBA) as a logical address. The SSD 11 receives, from the host 21, the command to read or write user data designated by the logical address. In the case of a read command, the SSD 11 transmits user data, stored in the NAND 17, to the host 21 via a read buffer (not shown). In the case of a write command, the SSD 11 stores user data received from the host 21 in the NAND 17 via a write buffer (not shown).

The front end 13 performs receive/transmit processing of host I/F commands to receive and transmit data from and to the host 21 via the host I/F 12. The front end 13 comprises, for example, a CPU 13a and a command queue 13b, and mainly processes the host IF commands. The function of the front end 13 is realized by software (firmware) executed in the CPU 13a.

The command queue 13b has a queue structure capable of buffering a plurality of commands, and is configured to receive a host IF command from the host 21, and to transfer the command to the back end 14 if the command corresponds to a user data read or write command. The CPU 13a of the front end 13 cooperates with the CPU 14a of the back end 14 to transfer data between the write buffer and the host 21 and between the read buffer and the host 21.

The back end 14 comprises, for example, the above-mentioned CPU 14a, a command queue 14b, a write buffer (not shown), a read buffer (not shown) and the above-mentioned DRAM 15. The function of the back end 14 is realized by firmware executed on the CPU 14a. The back end 14 functions as a controller configured to translate host IF commands into commands corresponding to the NAND 17 to thereby execute various types of processing. The back end 14 executes, for example, the following processing:

Responses to various commands, such as a write command and a read command, from the host 21
Reading and writing of user data by garbage collection for compacting of invalid areas in the NAND 17
Translation of a logical address from the host 21 into a physical address in the NAND 17
Update of the address translation table, a logical and physical block table, etc.
Processing of storing the tables in the NAND 17 to perpetuate them and to make them nonvolatile data
Management of a physical block table showing defective portions of physical block portions
Management of the number of valid clusters in a logical block The DRAM 15 stores, for example, an address translation table 15a, a logical and physical block table 15b and a defect in physical block table 15c. The address translation table 15a shows the correspondence between the LBA supplied as the logical address from the host 21, and the data position (block address+page address in each block) recorded in the NAND 17. The logical and physical block table 15b shows the correspondence between a logical block and a physical block group constituting the logical block, as described later. The physical block table 15c shows defective portions of bit groups stored in the NAND 17. Defective portions may be referred to as defective positions in the specification.

The DRAM 15 is a memory to which the supply of power can be partially shut off by, for example, limiting a range to be refreshed. The DRAM 15 is managed by the CPU 14a. The address translation table 15a, the logical and physical block table 15b and the physical block table 15c are normally stored in the NAND 17, and are read therefrom and expanded in the DRAM 23 on boot. The address translation table 15a and the logical and physical block table 15b in the DRAM 15 are saved and stored in the NAND regularly or at the time of power off. However, it is not necessary to always expand the entire address translation table 15a and logical and physical block table 15b in the DRAM 15, but may be read from the NAND 17 when necessary. The DRAM 15 will be described later in detail.

The command queue 14b has a queue structure capable of accumulating a plurality of commands, and translates an LBA in a command received from the front end 13 into a physical address in the NAND 17, using the address translation table 15a in the DRAM 15. Read or write commands including the physical addresses are supplied to the NAND controller 16.

The NAND controller 16 controls a data write and a data read to and from the NAND 17, based on commands issued by the back end 14.

The NAND 17 comprises a memory cell array having a plurality of memory cells arranged in a matrix. Each memory cell can store multi-level data using an upper page and a lower page. Data write and read are performed on a page basis. The NAND 17 is formed of a plurality of blocks, each block including a plurality of pages. The block is an erasing unit of data. Further, each page is formed of a plurality of data sectors. One sector is a minimum unit of access by the host. The size of a sector is, for example, 512 bytes.

The power supply 18 is formed of, for example, a rechargeable battery as a backup power supply, or of a capacitor. The power supply 18 supplies power to, for example, part of the DRAM 15 when power loss occurs, described later.

Figure 2:
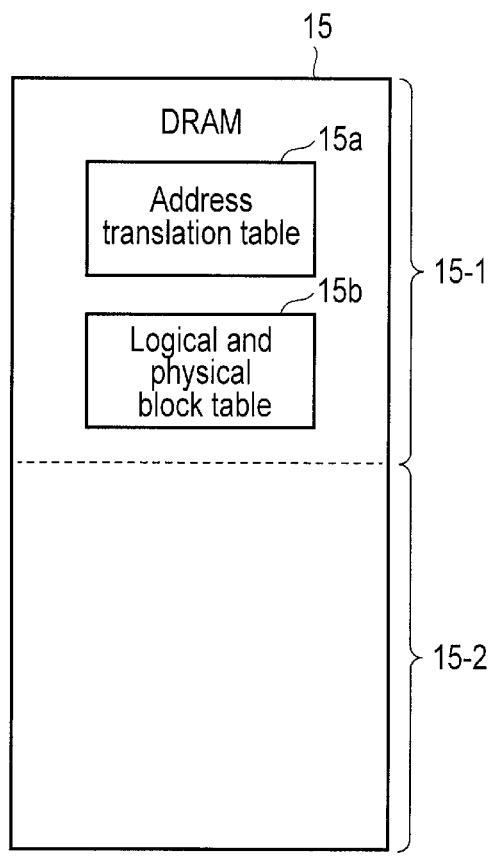
FIG. 2 is a view showing an example of the DRAM shown in FIG. 1.

FIG. 2 shows an example of the DRAM 15. As described above, the DRAM 15 is a memory that can be partially powered off. More specifically, the DRAM 15 has a partial array self refresh (PASR) function that enables selective refresh of, for example, a half or quarter area of the entire DRAM 15 from, for example, the lower address.

The supply of power to the DRAM 15 is shut off when there is no request to read or write user data from the host for a predetermined period of time. More specifically, in the following two cases, power is shut off. A first case is where the back end 14, for example, detects that the host 21 has not issued a read or write request for three seconds. A second case is where the host 21 explicitly requests the SSD 11 to transit to the low-power state. In these cases, the supply of power to the half area or three quarter area of the DRAM 15 is shut off. At this time, however, the power supply to the remaining half or quarter area of the DRAM 15 is continued, and therefore the data held in these areas is maintained as it is.

FIG. 2 shows a case where the power supply to the half area of the DRAM 15 is shut off. A first area 15-1 indicates an area where power is supplied, and a second area 15-2 indicates an area where power can be shut off. Accordingly, data, such as the address translation table 15a and the logical and physical block table 15b, needed for quick response to a request from the host 21 is held in the area 15-1 to which power is supplied.

The configuration of the SSD 11 is not limited to that of FIG. 1. For instance, the NAND controller 16 and the back end 14 may be integrated, while the DRAM 15 may be formed separate from the back end 14. Further, the volatile memory is not limited to the DRAM 15, but may be, for example, an SRAM. Similarly, the nonvolatile memory is not limited to the NAND 17.

The operations of the SSD 11 constructed as the above will now be described.

(Address Translation of User Data)

Figure 3:
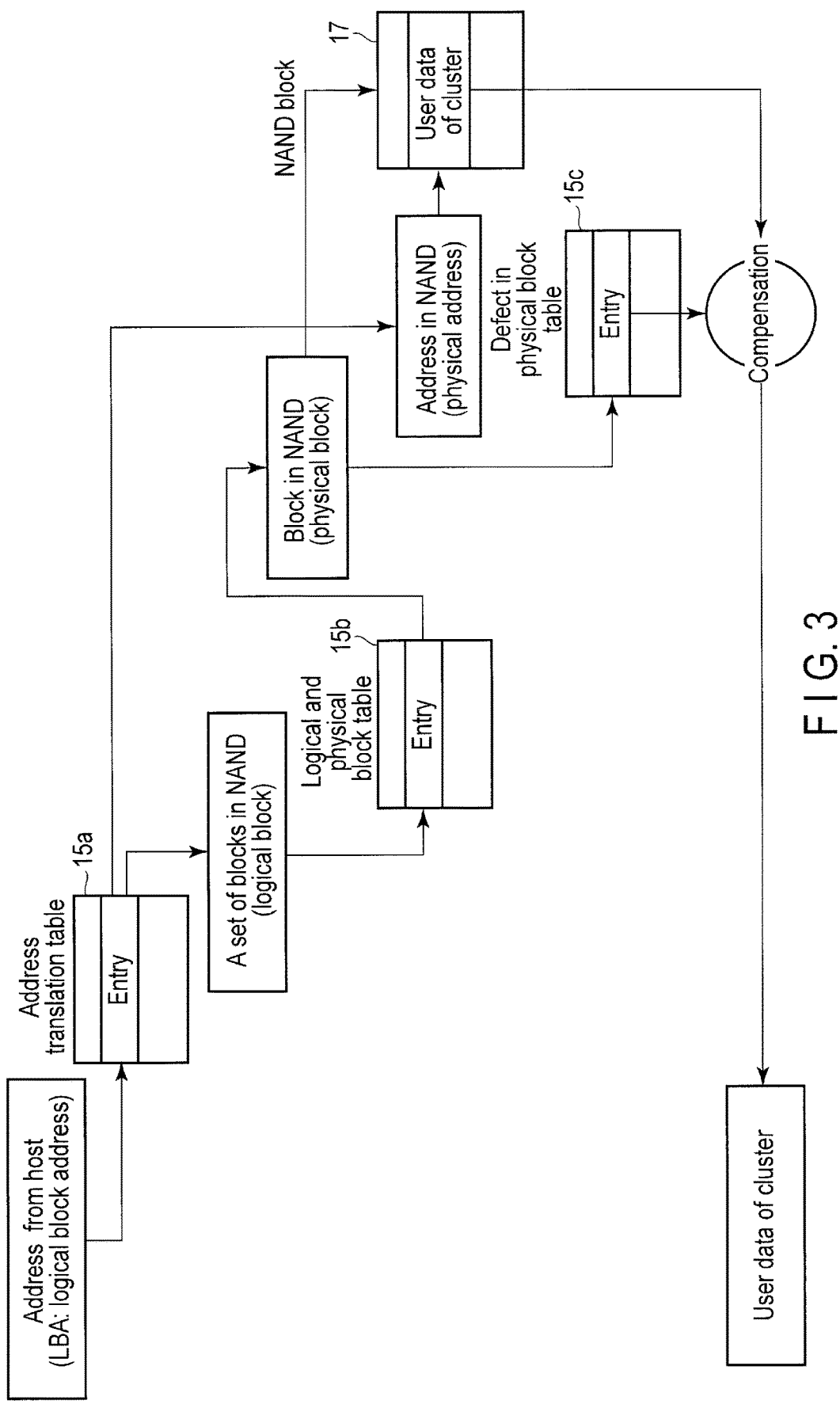
FIG. 3 is a block diagram showing an operation example of the back end shown in FIG. 1.

FIG. 3 shows the operation of the back end 14 performed when the host 21 has issued a user data read request.

In FIG. 3, the address translation table 15a translates a logical address supplied from the host 21 into a physical address indicative of a position in the NAND 17. To this end, each entry of the address translation table 15a is constituted of a physical address corresponding to a logical address. An upper address in an address obtained after translation indicates a physical block in the NAND 17, and a lower address in the address indicates a physical address in the physical block.

For convenience of the configuration of the back end 14, there is a case where a plurality of physical blocks may better be treated as one block. In this case, a set of physical blocks is called a logical block. In view of this, as shown in FIG. 3, a logical NAND block address (which is a logical block address in the NAND and differs from a logical address from the host) indicating a set of physical blocks is output. The logical and physical block table 15b indicates the correspondence between a logical block and a group of physical blocks constituting the logical block.

Figure 4:
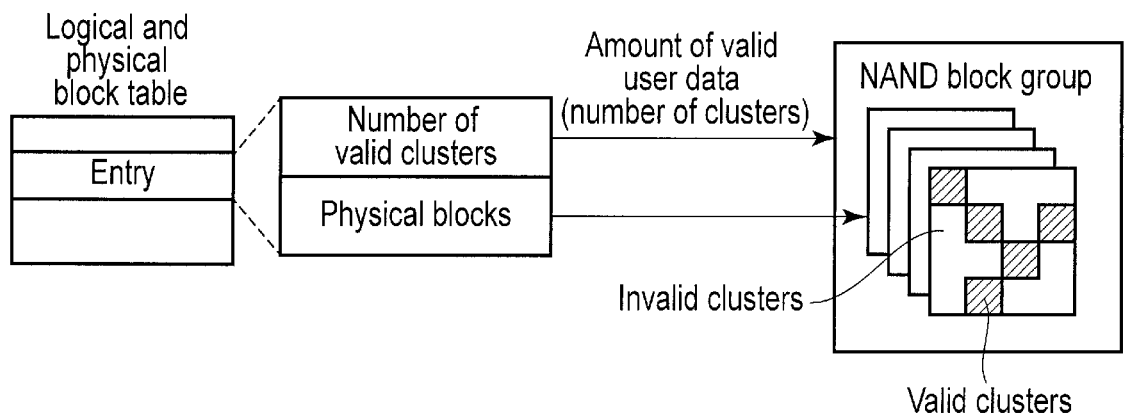
FIG. 4 is a view showing an example of the logical and physical block table shown in FIG. 1.

As shown in FIG. 4, each entry of the logical and physical block table 15b is made to correspond to a corresponding logical block address, and is constituted of data indicative of the number of valid user data clusters and a physical block structure. The physical block structure indicates a NAND physical block group (hereinafter, also referred to simply as NAND blocks), and the number of valid clusters indicates the amount of valid user data in the NAND block group, i.e., the total number of clusters to be referred to by the address translation table 15a. The cluster means a minimum unit to access to the NAND. Referring to the logical and physical block table 15b, physical blocks in the NAND 17 can be determined based on a logical block.

Further, as described above, the NAND 17 includes defective portions in a bit group of the NAND block, from or to which a data read or a data write is impossible. When accessing the NAND 17, the defective portions should be avoided.

The physical block table 15c shown in FIG. 3 stores addresses assigned to the defective portions of the NAND 17, and is configured to extract defective portions corresponding to physical blocks indicated by the logical and physical block table 15b. This enables defective portions to be corrected to generate user data clusters, when data is read from the NAND 17 in response to, for example, a read request from the host 21. More specifically, when, for example, user data is written, it is written to a cluster avoiding the defective portions. Further, when data is read from the NAND 17 in response to a read request output from the host 21, it is read from a group of bits that are free from the defective portions, is then reconstructed based on the data in the physical block table 15c, and is transmitted as user data to the host 21.

(Overwriting of User Data)

If the host 21 requests a write to an area of a single logical address a number of times, the last written user data becomes valid and the other data becomes invalid.

As shown in FIG. 5, writes associated with a single logical address in the NAND 17 are performed not by overwriting an area of a single physical address, but by performing writes to areas of different physical addresses. The address translation table 15a is updated such that a physical address, to the area with which a last write is made, is set to correspond to the logical address. Namely, the address translation table 15a does not show the physical address associated with the user data other than the last written user. This means that the user data other than the last written one becomes invalid.

As a unit for indicating whether user data is valid or invalid, a cluster as a minimum unit for writing to the NAND is used. Namely, to be valid or invalid is determined per cluster. One cluster is formed of data corresponding to, for example, 8 logical addresses. For instance, if data corresponding to one logical address is of 512 bytes, one cluster is of 4096 bytes.

(Garbage Collection)

If a write to a portion of the NAND corresponding to a single logical address is repeated, invalid clusters increase and writable pages decreased. To secure a writable NAND block, the valid clusters of a NAND block, the number of which has decreased, are shifted to another NAND block, and the NAND block from which the valid clusters have been shifted is erased. This processing is called garbage collection. To select to-be-erased blocks by garbage collection, information indicative of how much user data is included in each NAND block is needed.

In the example of FIG. 6, after the valid clusters in two NAND blocks are written to a single NAND block, these two NAND blocks are erased. As a result, a free area corresponding to one NAND block can be secured.

In order to determine how many valid clusters are included in each NAND block, by referring to the address translation table in the NAND 17, it is necessary to determine whether each cluster in each NAND block is valid. This processing requires a lot of time. In view of this, when a write request is issued from the host 21, or when garbage collection is performed, the number of valid clusters is figured out, and the number of valid clusters in the logical and physical block table is updated along with the update of the address translation table, as will be described later. The address translation table 15a and the logical and physical block table 15b of the back end 14 are updated, when necessary, based on the address translation table and the logical and physical block table of the NAND 17.

(Layering of Address Translation Table)

The capacity of the address translation table 15*a* is significantly large. Therefore, in order to reduce the amount of data processed at a time, the address translation table 15*a* may be layered. Firstly, a high level of a hierarchical structure is searched for, using the upper address of a logical address, and a low level of the hierarchical structure is searched for, using the search result of the high level and the lower address of the logical address. Thus, when the address translation table 15*a* is constructed to the hierarchical structure, it is not necessary to simultaneously store all content of the low level in the DRAM 15. Whether all content of the low level of the translation table should be simultaneously stored in the DRAM 15 is selectable depending upon the state of implementation of the embodiment, as described later.

FIG. 7 shows the correspondence relationship between each logical address and the address translation table 15*a*. As shown in FIG. 7, the address translation table 15*a* comprises a high level 15*a*-1 and a low level 15*a*-2. The upper address of each logical address corresponds to the high level 15*a*-1, and the lower address of the same corresponds to the low level 15*a*-2.

For instance, in a 32-bit logical address, the upper 19 bits are made to correspond to the high level 15*a*-1 of the address translation table 15*a*, the middle 10 bits are made to correspond to the low level 15*a*-2 of the address translation table 15*a*, and the lower 3 bits are made to indicate which 512-byte data in a cluster corresponds to the logical address.

Each entry of the high level 15*a*-1 includes data indicative of a location (physical address) in the NAND 17, and data indicative of the location of the low level 15*a*-2 in the DRAM 15. Further, each entry of the low level 15*a*-2 includes data indicative of a physical address in a NAND block corresponding to the middle bit address of the logical address.

Although FIG. 7 shows a case where both the high and low levels 15*a*-1 and 15*a*-2 are stored in the DRAM 15, the low level 15*a*-2 may not be stored in the DRAM 15, depending upon circumstances.

In the shown situations, in order to read user data, it is necessary to read data other than the user data from the NAND 17. In addition, even a physical block table associated with the areas stored in the NAND 17 may not be held in the DRAM 15, depending upon circumstances. Therefore, the following four reads are necessary at most:

(1) Reading a defective portion from an area of the NAND 17 that stores the low level 15*a*-2 of the address translation table 15*a*;

(2) Reading the content of each entry of the low level 15*a*-2;

(3) Reading a defective portion from an area of the NAND 17 that stores user data; and (4) Reading user data itself If 1 millisecond is required for one read operation, 4 milliseconds are required for four read operations. Note that such an implementation as enables only the high level of the address translation table 15*a* to be read from the NAND 17 cannot actually be realized. The reason for this will be described later.

Also in a write sequence of writing user data and the address translation table 15*a* to the NAND 17, four read operations are required as follows:

(1) Reading a defective portion from an area of the NAND 17 that stores the low level 15*a*-2 of the address translation table 15*a*;

(2) Reading the content of each entry of the low level 15*a*-2;

(3) Reading a defective portion from an area of the NAND 17 to which user data is to be written, and then writing user data itself; and (4) Reading a defective portion from an area of the NAND 17 that will stores the low level 15*a*-2 of the updated address translation table 15*a*, and then writing the content of each entry of the low level 15*a*-2

As described above, in reading and writing user data, it is necessary to read data other than the user data from the NAND 17.

(Making Metadata be Nonvolatile by Writing the Metadata to NAND)

Data other than user data, i.e., the address translation table 15*a*, the logical and physical block table 15*b*, the physical block table 15*c* and other management data (hereinafter, these are collectively referred to as "metadata") are also stored in the NAND 17. The metadata is appended to the NAND 17, like the user data. Accordingly, blocks storing the metadata are also managed.

Figure 8:
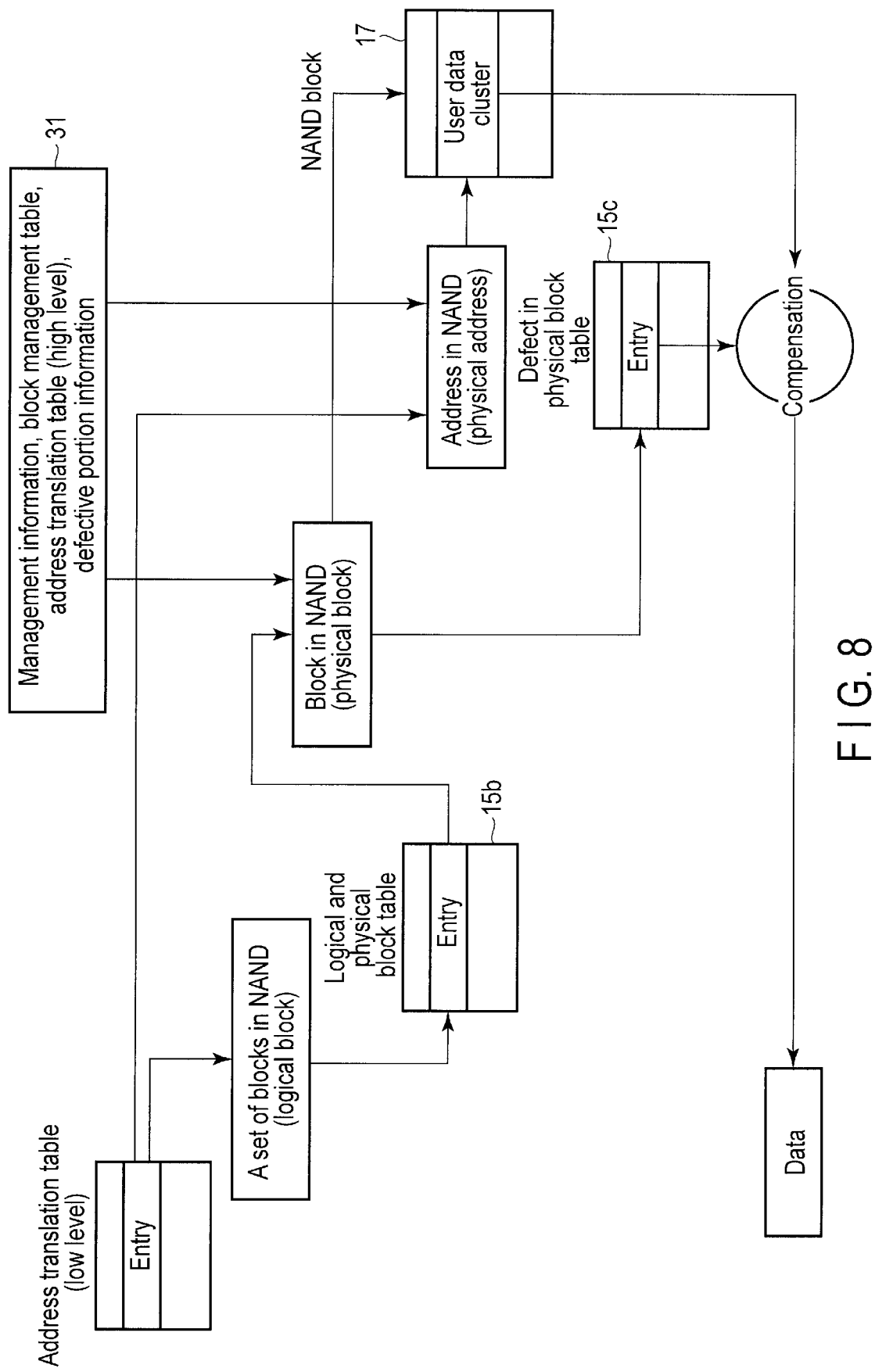
FIG. 8 is a view showing an example in which data other than user data is written to a nonvolatile memory.

The metadata may be stored in, for example, a logical block, like user data. Alternatively, the metadata (31) may be stored in a physical block in the NAND 17 without using the logical and physical block table 15*b*, as is shown in FIG. 8.

When the user data and the address translation table 15*a* are appended to the NAND 17, and when the appended data are subjected to compaction, it is necessary to determine whether the appended data is valid. To this end, data indicative of user data of which logical address has been appended to the NAND 17, or indicative of that the address translation table 15*a* has been appended to the NAND 17, is also written to the NAND 17. This information is called a log.

In view of the above circumstances, a description will be given of the relationship between the amount of user data and the amount of metadata (size in units of bytes) as a reference for determining what type of metadata is to be stored and how much metadata is to be stored.

As an example, a description will be given of the amount of user data and the capacity of the address translation table 15*a*. Each logical address is of 32 bits, is divided as mentioned above, and is made to correspond to the address translation table 15*a*. Assume here, for example, that a group of entries of the low level corresponding to one entry of the high level in the address translation table 15*a* is written and read as one cluster to and from the NAND 17. However, a plurality of groups of entries may be collectively treated as one cluster. In the latter case, the position in the NAND, in which the low level is stored, indicates the position in the cluster indicated by the lower bits of the logical address, like user data.

In this case, the size of the high level of the address translation table 15*a* needed for reading user data corresponding to one logical address corresponds to one cluster (4 Kbytes). The size of the low level for the same purpose is $2^{31}$ (2 Gbytes). The total size of the high level of the address translation table 15*a* is $2^{21}$ (2 Mbytes). From this, it is evident that there is a great difference between the entire capacity of the address translation table 15*a* and the capacity of the DRAM 15 needed for reading user data once.

Assume here that the high level of the address translation table 15*a* is not held in the DRAM 15 but is read from the NAND 17. To this end, it is necessary to read a plurality of the low levels which are appended to the NAND 17, beginning from one which is lastly written to the NAND 17, thereby detecting newest one.

Namely, to read user data corresponding to one logical address, it is necessary to read data from the entries of the low level of the NAND 17, i.e., to read data corresponding to the number of entries (of the order of $2^{20}$). Since about 1 millisecond is needed to read data from the NAND 17 once, sufficiently quick response (of, for example, 0.1 second) cannot be made to the host. Further, to read the high level of the address translation table 15a from the NAND 17, the low level must be read simultaneously. Therefore, it is not practical to design such that only the high level is read from the NAND 17, and it is necessary to hold the high level of the address translation table 15a in the DRAM 15.

(Layering in Physical Block Table)

Similar descriptions to those given of the address translation table 15a also apply to the physical block table 15c. It is assumed that defective portions are 1% of one cluster (4096 bytes), i.e., 328 (=4096*8*0.01), and 16 bits are required to indicate the position of one defective portion. In this case, to indicate defective portions corresponding to one cluster of the user data, 656 bytes (=328*16/8) are necessary.

Because of the structure of the NAND 17, a defective portion may cover a plurality of write units, e.g., clusters or pages. In this case, information associated with the defective portion can be stored in a unit greater than a cluster. Assume here that 16 clusters have respective defective portions of the same position.

In this case, the capacity of the physical block table is 1% (656/(4096*16)) of the user data corresponding to one cluster (4096 bytes). If user data is stored with the capacity for the physical block table rounded up by 1% to $1/64$ (=$2^6$), the total capacity of the physical block tables in the NAND 17 becomes 32 Gbytes (=$2^{35}$/N).

The total capacity of the defective portions in the NAND 17 that store the low level of the address translation table 15a is 16 times (i.e., $2^{35-31}=2^4$) the total capacity of the low level of the address translation table 15a. The defective portion data of the NAND block storing the low level of the address translation table 15a is of 32 Mbytes (=$2^{31-6}$).

Therefore, the capacity of the DRAM 15 that is required at a time can be suppressed by layering the physical block table 15c, like the address translation table 15a.

On boot of the SSD 11, the physical block table 15c of the uppermost layer, which has been subjected to error correction and hence has no errors, is developed in the DRAM 15. After that, when the physical block table 15c is read from the NAND 17, it is read with detective portions avoided, thereby acquiring user data to access or defective portions of metadata. Thus, when the physical block table 15c is layered, the number of times of reading the physical block table 15c from the NAND 17 becomes twice.

The total capacity of the high level of the translation table 15c (hereinafter, also referred to simply as the high level) is the sum of 64 Kbytes (=4 bytes×$2^{14}$ entries) as a capacity corresponding to positions, in the NAND 17, of holding the middle levels of the physical block table 15c (also referred to simply as the middle levels), 656 Kbytes (=656 bytes× $2^{14}/16$) as a capacity corresponding to the defective portions (which are common in position among the sixteen entries) in the NAND 17, and 64 Kbytes (=4 bytes×$2^{14}$ entries) as a capacity corresponding to a position, in the DRAM 15, of holding the high level. Accordingly, if the DRAM 15 has a storage capacity of 1 Mbytes, it can hold all content of the high level of the physical block table 15c. The capacity required for holding, at a time, one middle level, i.e., a set of low levels, is $1/32$ (=$2^{14-9}$) the storage capacity, i.e., 32 Kbytes.

Figure 9:
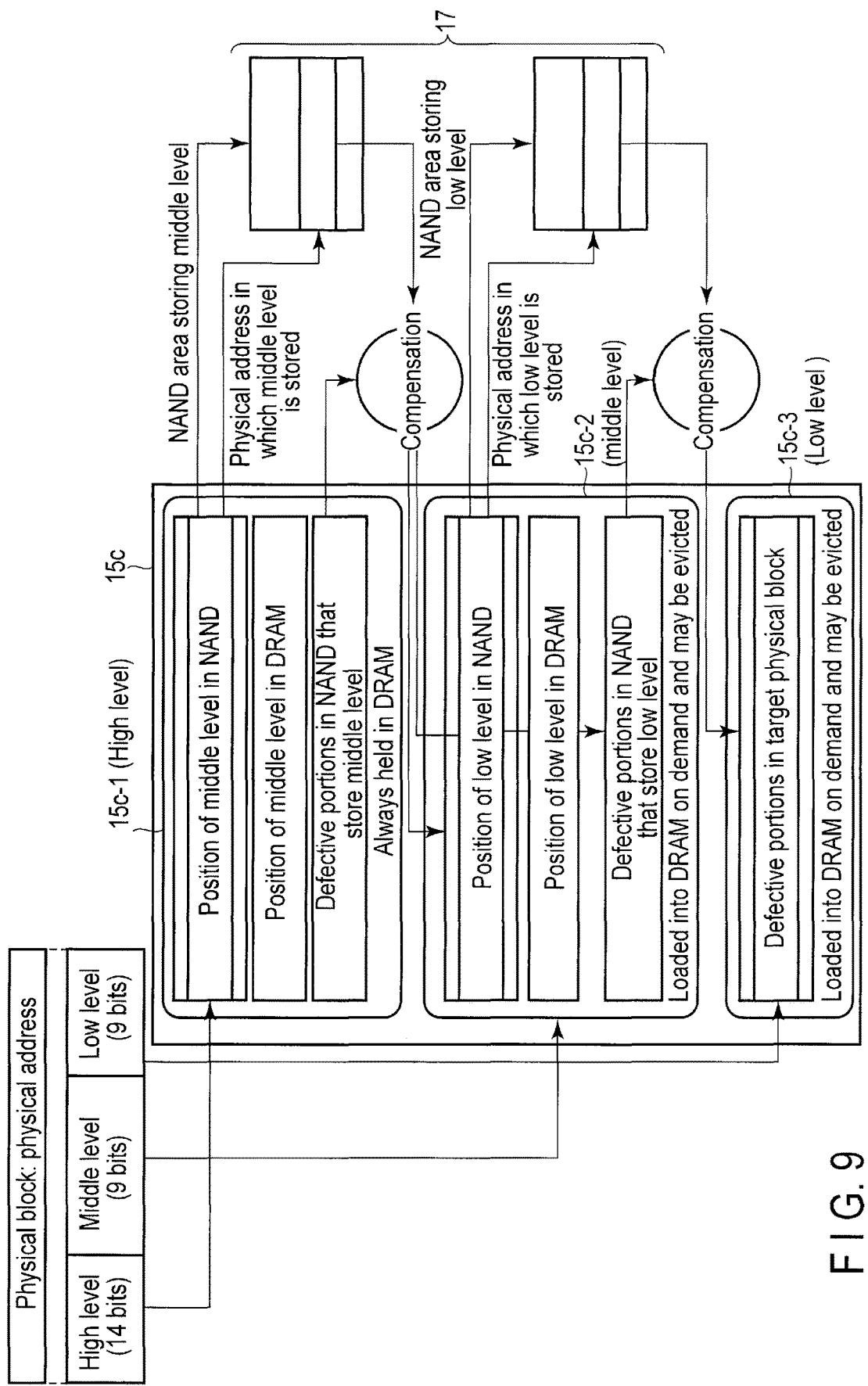
FIG. 9 is a view showing an example in which a physical block table in the DRAM is layered.

FIG. 9 shows an example of the layered physical block table 15c in the DRAM 15. The physical block table 15c comprises a high level 15c-1, a plurality of middle levels 15c-2, and a plurality of low levels 15c-3. Using the upper 14 bits of a 32-bit physical block address, an entry of the high level 15c-1 is searched for. Similarly, using the middle 9 bits, an entry of the middle level 15c-2 is searched for, and using the lower 9 bits, an entry of the low level 15c-3 is searched for.

The entries of the high level 15c-1 indicate record positions of the NAND 17 in which the middle levels are recorded, also hold defective portions in the NAND 17 that store the middle levels, and hold the positions in the DRAM 15 that hold the middle levels.

The respective middle levels 15c-2 are read from the NAND 17 storing the middle levels, and are corrected based on defective portions 15c-1 in the NAND 17 storing the middle levels. The corrected middle levels are supplied and held in the middle levels 15-2.

The respective entries of the middle levels 15c-2 indicate the record positions of the NAND 17 in which the low levels are stored. The middle levels 15c-2 hold the defective portions of the NAND 17 in which the low levels are stored, and also hold the holding positions of the DRAM 15 in which the low levels are held.

The respective low levels 15c-3 are read from the NAND 17 that stores the low levels, and are corrected based on the defective portions of the NAND 17 storing the low levels. The corrected low levels are supplied to and held in the low levels 15c-3. Upon receiving the physical block addresses of the low level, the respective low levels 15c-3 output defective portions of target physical blocks in the NAND 17.

The high level 15c-1 in the physical block table 15c must be always stored in the DRAM 15. In contrast, the middle levels 15c-2 and the low levels 15c-3 may be stored in the DRAM 15 only when necessary.

During activation (i.e. on boot), the high level 15c-1 in the physical block table 15c is read from the NAND 17 and held in the DRAM 15. Using the held high level 15c-1, a middle level 15c-2 of the physical block table 15c is read from NAND 17 and held in the DRAM 15. Using the held middle level 15c-2, a low level 15c-3 of the physical block table 15c is read from the NAND 17 and held in the DRAM 15. Using the held low level 15c-3, data is read from a physical block of the NAND 17 storing user data.

Although the physical block table 15c shown in FIG. 9 comprises the high level 15c-1, the middle levels 15c-2 and the low levels 15c-3, the embodiment is not limited to this, but may be modified such that the table has a two-layer structure of high and low levels.

(Content of the DRAM 15)

The embodiment can reduce the power supplied to the DRAM 15 by optimizing data held on the DRAM 15.

As described above, the DRAM 15 has a function called PASR, and can selectively turn off power by selecting the range of refresh during operation of the DRAM 15. If there is no user data read or write from the host 21 for a predetermined period of time, the power to the DRAM 15 is turned off. More specifically, if the back end 14 detects that there is no read or write request from the host 21 for a predetermined period of time (e.g., three seconds), or if an explicit request to set the SSD in a low-power state is issued from the host 21, the back end 14 partially cuts the supply of power to the DRAM 15. Thus, the supply of power to the DRAM 15 is partially cut to reduce its power consumption.

Figure 10:
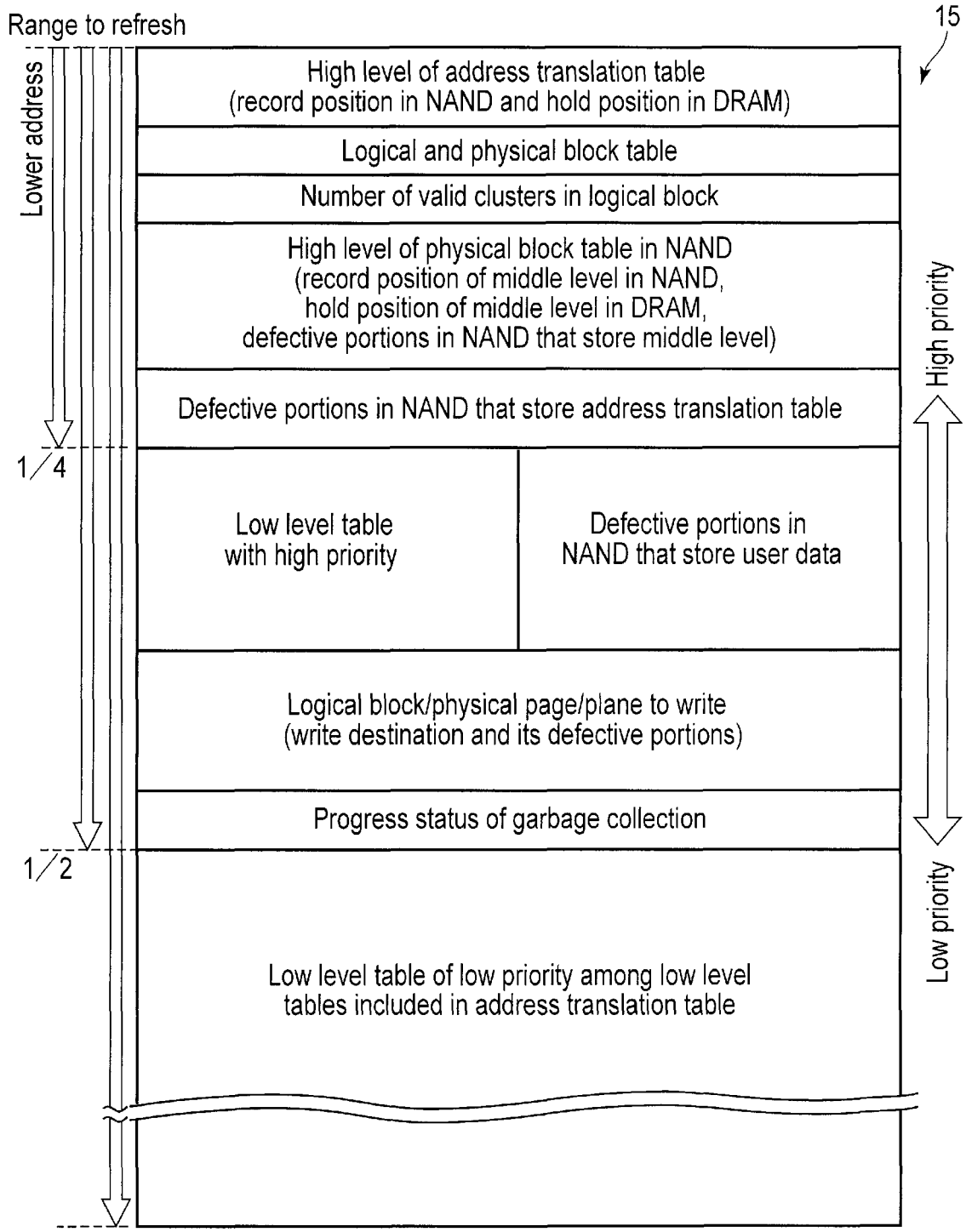
FIG. 10 is a view showing the relationship between the refresh range of the DRAM in a low-power state and the storage content.

FIG. 10 shows the relationship between the refresh range (indicated by the arrows) in the DRAM 15 that is in a low-power state, and the storage content. More specifically, in a normal power consumption state, the entire area of the DRAM 15 is refreshed and data have been held. In contrast, in the low-power state, in the DRAM 15, for example, only a half or quarter address space from the lower address is refreshed. Whether the half or quarter address space is refreshed depends upon a required power consumption. Thus, the capacity of data holding of the DRAM 15 is reduced compared to the normal power consumption state.

On the other hand, when a read or write request has been issued from the host 21, or when the low-power state has been released, the memory system must be made highly responsible to the host 21. Therefore, data to be held in an area of the DRAM 15 supplied with power, and data that is not necessary to hold, are defined as follows:

(1) Data to be Held in the DRAM 15

The data which needs to scan the NAND 17 in order to access the data. In this case, the time required for acquiring the data is proportional to a capacity of the NAND 17, or longer than it. If such data is needed for user data reading or writing, response to the host 21 is impossible within a limited time (for example, 2 seconds) required by the host 21. To avoid this, such data is held in the DRAM 15.

(2) Data that is not Necessary to Hold in the DRAM 15

In order to access the data, if it is known how many times the NAND 17 should be accessed at maximum, and the number of times of access is small enough (e.g., 5 times). Such data does not always have to be held in the DRAM 15.

The data that must be held in the DRAM 15 based on the above definitions includes the high level (the record positions of the low levels in the NAND 17, and the hold positions of the DRAM 15) of the address translation table 15a, the logical and physical block table 15b and the number of valid clusters of a logical address, and the high level 15c-1 of the physical block table 15c in the NAND 17 (the record positions of the middle levels in the NAND 17, the hold positions of the middle levels in the DRAM 15, the defective portions of the NAND area storing the middle levels), as is shown in FIG. 10. However, if the physical block table 15c is formed of two levels, i.e., the high and low levels, the content of the high level 15c-1 includes the record positions of the low levels in the NAND 17, the hold positions of the low levels in the DRAM, and the defective portions of the NAND area storing the low levels.

This is because of the following: To read the high level of the address translation table 15a from the NAND 17, it is necessary to scan the log of the address translation table 15a in the NAND 17. Further, as described above, to calculate the number of valid clusters of the logical and physical block table 15b, it is necessary to scan user data in the NAND 17. Also regarding the high level 15c-1 of the physical block table 15c in the NAND 17, the NAND 17, in which the high level 15c-1 of the physical block table 15c is written, is needed to be scanned with defective portions subjected to error correction, thereby using data succeeded in error correction. This requires a lot of time for acquiring necessary data.

Since it is selectable to which range of the DRAM 15 power is to be supplied, the area supplied with power will have a free area, if only the above-mentioned data is held therein. To effectively use the free area, priorities may be assigned to other data, and data having higher priorities may be held in the free area supplied with power.

As shown in FIG. 10, data of the highest priority is defective portions in the NAND 17 that store the address translation table 15a. The data having second higher priority is a low level table with high priority included in a group of low level tables of the address translation table 15a, or defective portions in the NAND 17 which store user data. Higher priorities are assigned to the most recently used address translation table 15a and the most recently used physical block table of the NAND 17.

As lower priority data, there are defective portions corresponding to, for example, a logical block to write. As yet lower priority data, there is data indicative of the progress status of garbage collection.

Data of higher priorities is held as long as possible in the area of the DRAM 15 always supplied with power, while data of lower priorities is held in accordance with the ratio of a free area in the area of the DRAM 15 supplied with power. If there is no free area, the data is not held in the DRAM 15, and is read from the NAND 17 when necessary.

Based on access records associated with each logical address, a higher priority is assigned to an address that has a stronger possibility of being read next. For instance, based on a temporal locality that a logical address recently used for reading or writing may be accessed again, a priority is assigned utilizing an algorithm, such as least recently used (LRU). Alternatively, priority assignment can be done based on a spatial locality that a logical address subsequent to a recently read logical address may be read soon. By holding data of higher priorities thus assigned in the DRAM 15, the DRAM 15 can be quickly transited to the normal power consumption state from the low-power state when the host 21 has issued a read request during the low-power state. Thus, the time required for a response to the host 21 can be shortened.

For priority assignment, other various methods can be utilized. For instance, easier assignment can be realized if, for example, first in first out (FIFO) is used in place of LRU.

FIG. 11 shows an example of a FIFO structure, in which the low level of the address translation table 15a is held in the DRAM 15. In FIG. 11, if an entry that is not held in the DRAM 15 is used, a highest priority is assigned to the entry (S1), and the entries of the priorities other than the entry of the highest priority are lowered to priority (S2). If the entry held in the DRAM 15 is used, it is set to a highest priority (S3). If the DRAM 15 has no area for holding an entry, an entry of the lowest priority is removed from the DRAM 15 (S4).

Yet alternatively, in the priority assignment, a hint that a logical address will be used for reading or writing in near future may be imparted in accordance with a read or write request from the host 21, and the priority may be determined based on the hint.

Yet further, defective portions corresponding to the storage area of the NAND 17 that records an address translation table may be held in the area 15-1 of the DRAM 15 in preference to defective portions corresponding to the storage area of the NAND 17 that stores user data.

By virtue of the above structure, three types of data, such as the data of the high level of the address translation table 15a having a highest priority, the number of valid clusters of each logical block of the logical and physical block table 15b, and the high level content of the defective portions of the NAND 17, are held in the DRAM 15. Accordingly, when the low levels of the address translation table 15a are referred to for reading user data, it is necessary to access the NAND 17 only for the user data, and it is not necessary to access the NAND for the three types of data, i.e., the data of the high level of the address translation table 15a having the highest priority and held in the DRAM 15, the number of valid clusters of each logical block of the logical and physical block table 15b, and the high level content of the defective portions of the NAND 17. Further, the defective portions of the NAND 17 that store the address translation table and have an intermediate priority are needed to be read from the NAND 17 once. Furthermore, in order to read the defective portions of the NAND 17 that store the address translation table 15a as data of the lowest priority and user data from the NAND 17, twice reads are required.

The holding of the address translation table 15a and the defective portions based on the priority will now be described in view of the memory functions. In the DRAM 15 having a short latency and a small capacity, data frequently accessed within a short time are hold. Namely, the area of the DRAM 15 always supplied with power is set smaller than the other area to which the supply of power is shut off. The area of the DRAM 15 always supplied with power holds data of higher priorities, and the area, the supply of power to which is shut off, holds data of lower priorities.

In addition, the data of lower priorities is read from the NAND 17 whenever it is needed, because the NAND 17 has a longer latency and a greater capacity than the DRAM 15. To further improve the latency and throughput, a volatile memory for temporarily holding data, such as a static RAM (SRAM), may be added, as well as the DRAM 15.

FIG. 12 schematically shows the memory structure assumed when an SRAM is added. As shown in FIG. 12, an SRAM 41 as a memory of a low latency and a small capacity is provided, and the area of the DRAM 15 always supplied with power and the area of the DRAM 15, the supply of power to which is shut off, are provided in this order as the latency and capacity are increased. Lastly, the NAND 17 as a memory of a high latency and a large capacity is provided.

Data as reference and to-be-updated data is transferred from the NAND 17 to the SRAM 41 via the DRAM 15, and updated data is written to the SRAM 41, the DRAM 15 and the NAND 17 in this order. Thus, data of the highest priority is held in the SRAM 41, and data of lower priorities are held in the DRAM 15 and the NAND 17.

Using, for example, the following two methods, data assignment to the areas of the DRAM 15 based on priority will be executed:

In a first method, the above processing is executed in accordance with user data read or write based on garbage collection or a request from the host 21.

In a second method, positions are not fixed during normal reading or writing where in the DRAM 15 data should be located, and when the host 21 has requested a transition to the low-power state, the data in the DRAM 15 is rearranged in accordance with the priorities. Upon receiving, from the host 21, a request to transit to the low-power state, the back end 14 collects data of higher priorities in the area of the DRAM 15 always supplied with power. The data in the other area of the DRAM 15 will be lost when power is shut off.

A write to the NAND 17 is executed in accordance with a predetermined procedure determined by the back end 14, regardless of the logical address. Accordingly, it is beforehand known that subsequent data is written to a subsequent plane (i.e., an area including a plurality of physical blocks in a memory cell array) or a subsequent page of the lastly written one of the NAND. Therefore, by holding defective portions of a plane or page as a write destination in a nonvolatile memory, processing of reading defective portions as write destinations from the NAND 17 can be omitted. As a result, a response time to a write request from the host 21 can be shortened, even if the request occurs during a low-power operation.

(Processing of Transiting to Low-Power State)

Figure 13:
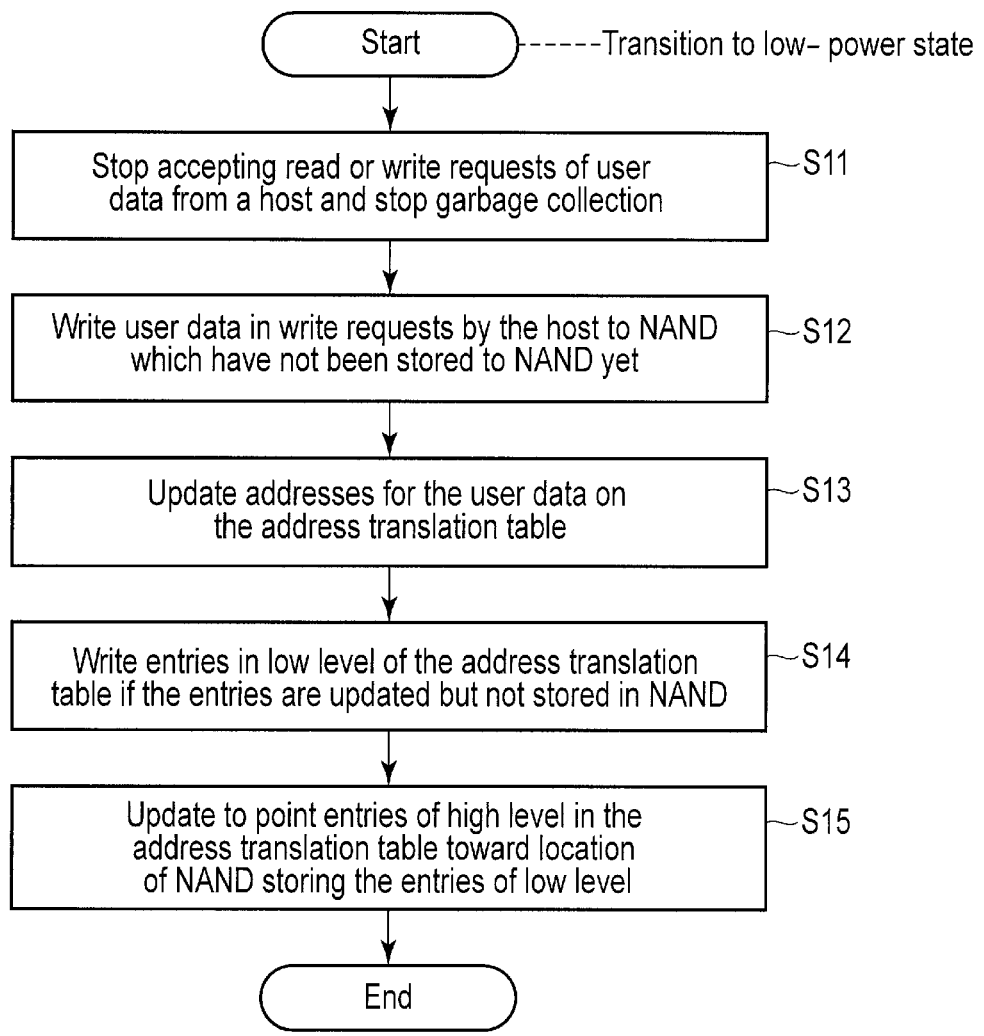
FIG. 13 is a flowchart for explaining an operation example of the back end performed at the time of transition to a low-power state.

FIG. 13 shows an example of an operation of the back end 14 performed at the time of transition to the low-power state.

For instance, when there is no read or write request from the host 21 for a predetermined period of time during normal operation, a transition to the low-power state is performed. At this time, the back end 14 does not accept a user data read or write request. Further, reading from or writing to the NAND 17 which is automatically performed by the back end 14, i.e., garbage collection is stopped (S11).

Subsequently, a write request was previously issued from the host 21, and although a response indicative of its write completion was issued to the host 21, if there is user data which is not yet stored in the NAND 17, the data is written to the NAND 17 (S12).

After that, the address translation table 15a in the DRAM 15 is updated to indicate the position of the user data in the NAND 17 (S13). Namely, the high and low levels of the address translation table 15a are updated.

Thereafter, the low levels of the address translation table 15a in the DRAM 15 updated in step S13 and, the low levels of which the updates are not yet reflected in the NAND 17, are written to the NAND 17 (S14). In the embodiment, the high level of the address translation table 15a is held in the area of the DRAM 15 supplied with power during a transition to the low-power state, and is therefore not stored in the NAND 17.

After that, the high level of the address translation table 15a is updated to indicate the position of the NAND 17 in which the low level is stored (S15).

If in step S14, the high level is written to the NAND 17 whenever a transition to the low-power state occurs, a write amplification factor (WAF) indicative of how many times the amount of data actually written to the NAND 17 compared with the amount of data supplied from the host 21 is will increase, which is inconvenient.

Further, where middle levels are employed as in the aforementioned physical block table 15c, changed data is stored in the NAND 17 from the low levels to the high level in order, and the physical block table 15c is updated so as to indicate a position in the NAND 17 in a higher level by one stage.

(Processing of Transition from Low-Power State)

Figure 14:
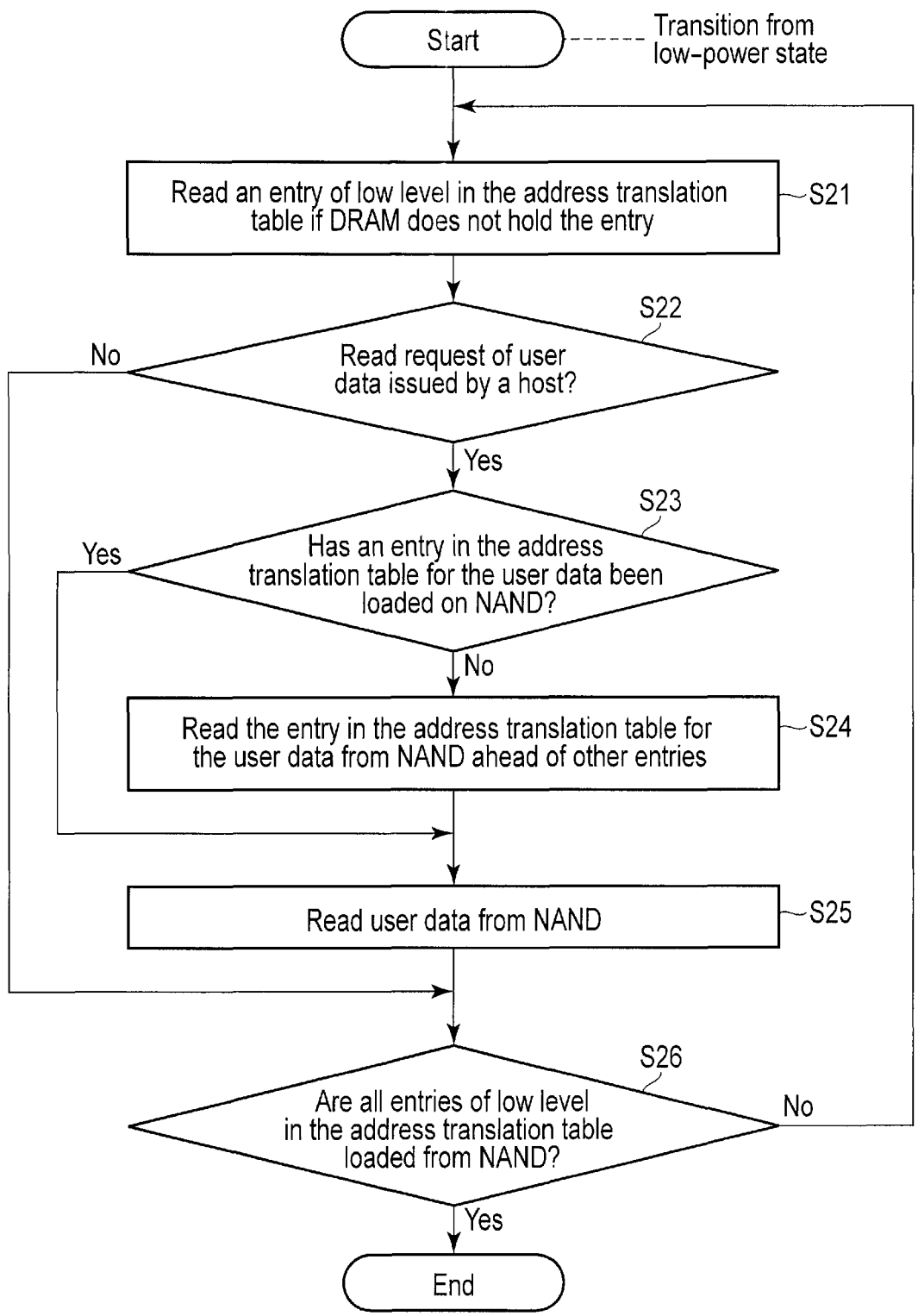
FIG. 14 is a flowchart for explaining an operation example of the back end performed at the time of transition from the low-power state.

FIG. 14 shows an example of an operation of the back end 14 performed when the device is returned from the above-mentioned low-power state.

When, for example, the host 21 explicitly requests the SSD 11 to be returned from the low-power state, the supply of power to the area of the DRAM 15, to which the supply of power was shut off, is resumed. In this state, the back end 14 firstly reads a low level of the address translation table 15a from the NAND 17 (S21). This processing is performed in parallel with processing in steps S22 to S25, except for determination processing in step S26 described later.

Subsequently, it is determined whether a user data read request has been issued from the host 21 (S22). If it is determined that the user data read request has been issued, it is determined whether the address translation table 15a associated with the user data is already read from the NAND 17 (S23). Namely, it is determined whether the address translation table 15a in the DRAM 15 includes a low level corresponding to the requested user data has been requested. If there is no low level corresponding to the requested user data, the low level corresponding to the requested user data is read from the NAND 17 in preference to the other low levels (S24).

If in step S23, it is determined that the low level corresponding to the requested user data is already read, or if in step S24, the low level corresponding to the requested user data has been read, the requested user data is read from the NAND 17 using the address translation table 15a (S25).

Thereafter, it is determined whether all of the low levels of the address translation table 15a have been read from the NAND 17 (S26). If it is determined that all of the low levels have not been read, control is transited to step S21, where the above-described operations are iterated. In contrast, if it is determined that all of the low levels of the address translation table 15a have been read, the user data read in step S25 is transferred to the host 21.

Figure 15:
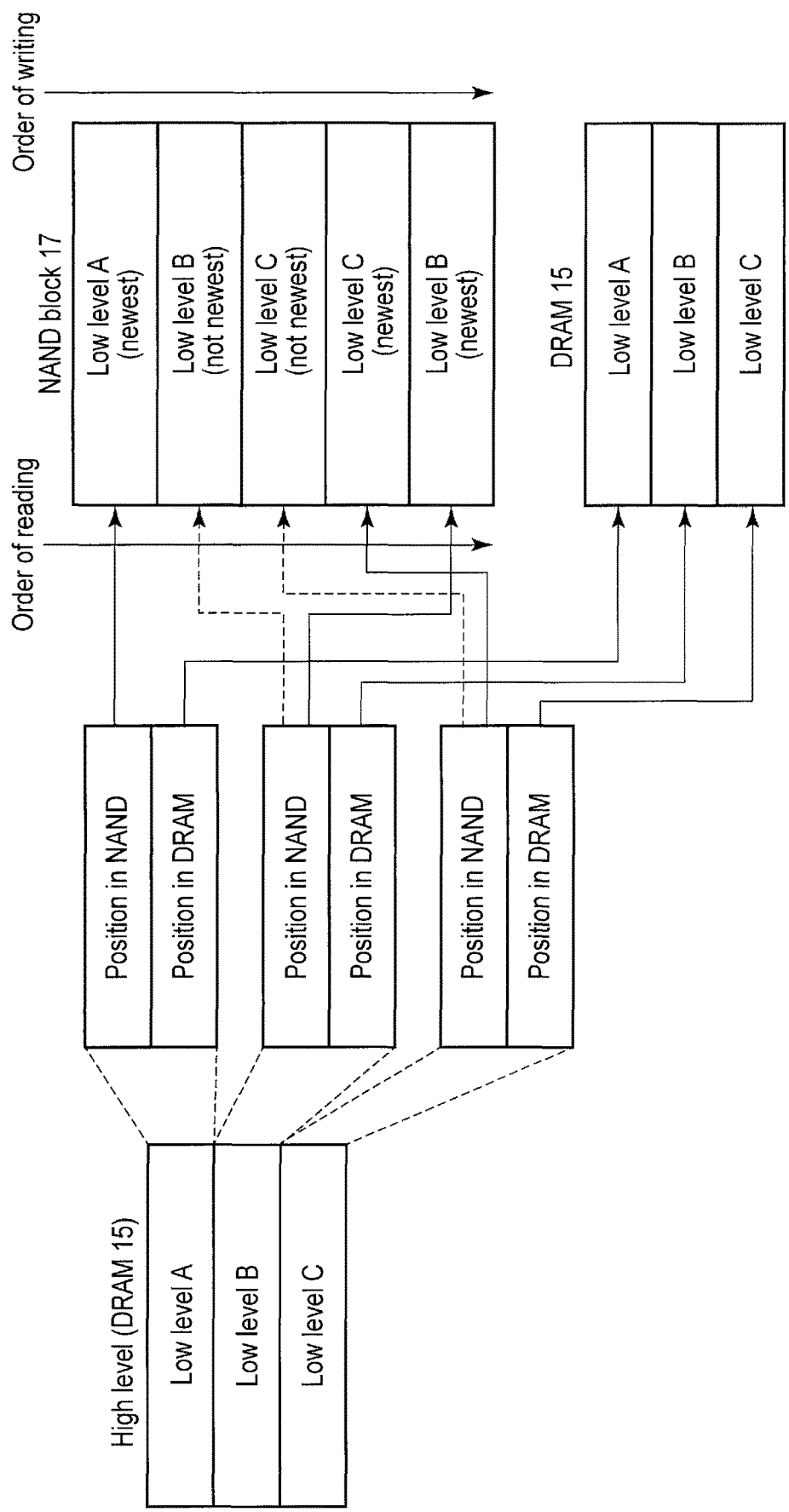
FIG. 15 schematically shows an operation performed when the high level of the address translation table is reconstructed.

FIG. 15 schematically shows the operations performed to reconstruct the high level of the address translation table 15a. As described above, the high level of the address translation table 15a can be reconstructed in the DRAM 15 by reading a plurality of low levels from the NAND 17.

As shown in FIG. 15, the high level of the address translation table 15a includes a plurality of low level entries. Each entry comprises a record position in the NAND 17 and a hold position in the DRAM 15. The record position in the NAND 17 indicates a physical address assigned to a position in the NAND 17, to which a low level of the address translation table is written. However, each low level in the address translation table 15a is appended to the NAND 17 whenever the table is updated. Accordingly, in association with, for example, a low level B or a low level C in the address translation table shown in FIG. 15, the table (newest table) lastly written to the NAND 17 is valid, and the table (not the newest table) written before the last table is invalid.

Therefore, as shown in FIG. 15, it is checked in which order the low levels of each address translation table were written to the NAND 17, and the physical address of a corresponding newest low level in the NAND 17 is held in a corresponding entry of the high level in the DRAM 15, thereby constituting the high level. Subsequently, in accordance with data in each entry of the thus-constituted high level, data of low level is read from the NAND 17, and is held in the DRAM 15.

If middle levels are provided as in the physical block table 15c, they are constructed from the low levels, and the high level is constructed from the middle levels.

Further, if it is determined in step S26 of FIG. 14 that all the low levels of the address translation tables 15a are not yet read from the NAND 17, it is optional to read all low level tables from the NAND 17. For instance, if it is judged that to reduce power consumption, it is not necessary to read all low level tables from the NAND 17, or if the power state is again transited to the low-power state, reading of the low level tables can be stopped.

Furthermore, although FIG. 14 shows the operation performed when the low levels of the address translation table 15a are restored, the same operation as the above is also performed to restore each physical block table 15c of the NAND 17. Specifically, when the host 21 has issued a request to read, for example, user data, a physical block table necessary for this read request is read from the NAND 17 before the other physical block tables are read, thereby constructing the corresponding physical block table 15c. In this case, firstly, the high level 15c-1 of a physical block table 15c is read from the NAND 17 based on the held position of the high level held in the DRAM 15. Based on the high level 15c-1, middle levels 15c-2 and low levels 15c-3 are read from the NAND 17, thereby constituting the physical block table 15c.

Yet further, also when the host 21 has issued a user data write request, a low level address translation table 15a needed for the write request, and a corresponding physical block table of the NAND 17 are read from the NAND 17 in preference to the other data, as in the case of read request mentioned above.

In addition, if the host 21 has requested a transition to a low-power state, or if the host 21 has not issued a user data read or write request for a predetermined period of time, defective portions of a block to which the user data requested to be written by the host 21 is to be written, defective portions of a block to which the user data to be moved for garbage collection is to be written, and defective portions of a block to which the address translation table 15a is to be written, are held in the area 15-1 of the DRAM 15 to which power is supplied.

(Power Loss Protection)

A description will now be given of processing performed when the power of the SSD 11 is unexpectedly shut off, i.e., power loss processing.

The above-mentioned processing performed in the low-power state is also applicable to power loss processing. To reduce the required capacity of a battery as the power supply 18 shown in FIG. 1 or the required capacity of the capacitor, it is desirable to shorten the time required for power loss processing.

If power is shut off during writing user data, power loss processing is performed. In power loss processing, it is necessary to make user data nonvolatile, which is not yet written the user data to NAND 17 although a response indicative of that a write of the user data to the host 21 has been completed is returned. To shorten the time required for writing the user data to the NAND 17, a dedicated block for writing data using a data structure different from a normal data structure is prepared, and the user data is written to this block. The data stored in the dedicated block is reflected in the normal data structure for the next activation.

A logical and physical block table and a physical block table associated with the dedicated block are always held in the DRAM 15. By virtue of this structure, no physical block table is read from the NAND 17 when power loss has occurred, with the result that the time required for power loss processing can be shortened by, for example, 1 msec.

In addition, when the power loss processing is started, the supply of power to the user data already written to the NAND 17 and to the area of the DRAM 15 that holds the address translation table 15a is shut off. As a result, the power required for the power loss processing is reduced, thereby reducing the required battery capacity.

As another modification, if there is no user data read or write request from the host 21 for a predetermined period of time during garbage collection, the device is transited to the low-power state. This means that progress of the garbage collection must be held. The data held as the halfway progress indicates defective portions in source and destination blocks, the address translation table 15a for determining whether each cluster in the source blocks is valid, and a set of valid clusters determined to be written to the destination blocks.

For these data items, it is not determined whether they are stored based on priority. Namely, the data always held in the DRAM 15 is fixed in position in the DRAM 15. This can shorten the time required for a transition to the low-power state.

(Advantage)

In the above-described embodiment, when the device is transited to the low-power state, the high level of the address translation table 15a, the number of valid clusters in the logical blocks of the logical and physical block table 15b, and the high level of the physical block table 15c are held in the area of the DRAM 15 supplied with power. This reduces the amount of data read from the NAND 17 when the device is returned from the low-power state. Therefore, it is possible to decrease the response time to the host 21.

Moreover, the data held in the DRAM 15 is set necessary minimum in order to increase the speed of response to the host 21. As a result, the area of the DRAM 15 supplied with power can be reduced, and hence the consumption of power can be reduced.

Figure 16:
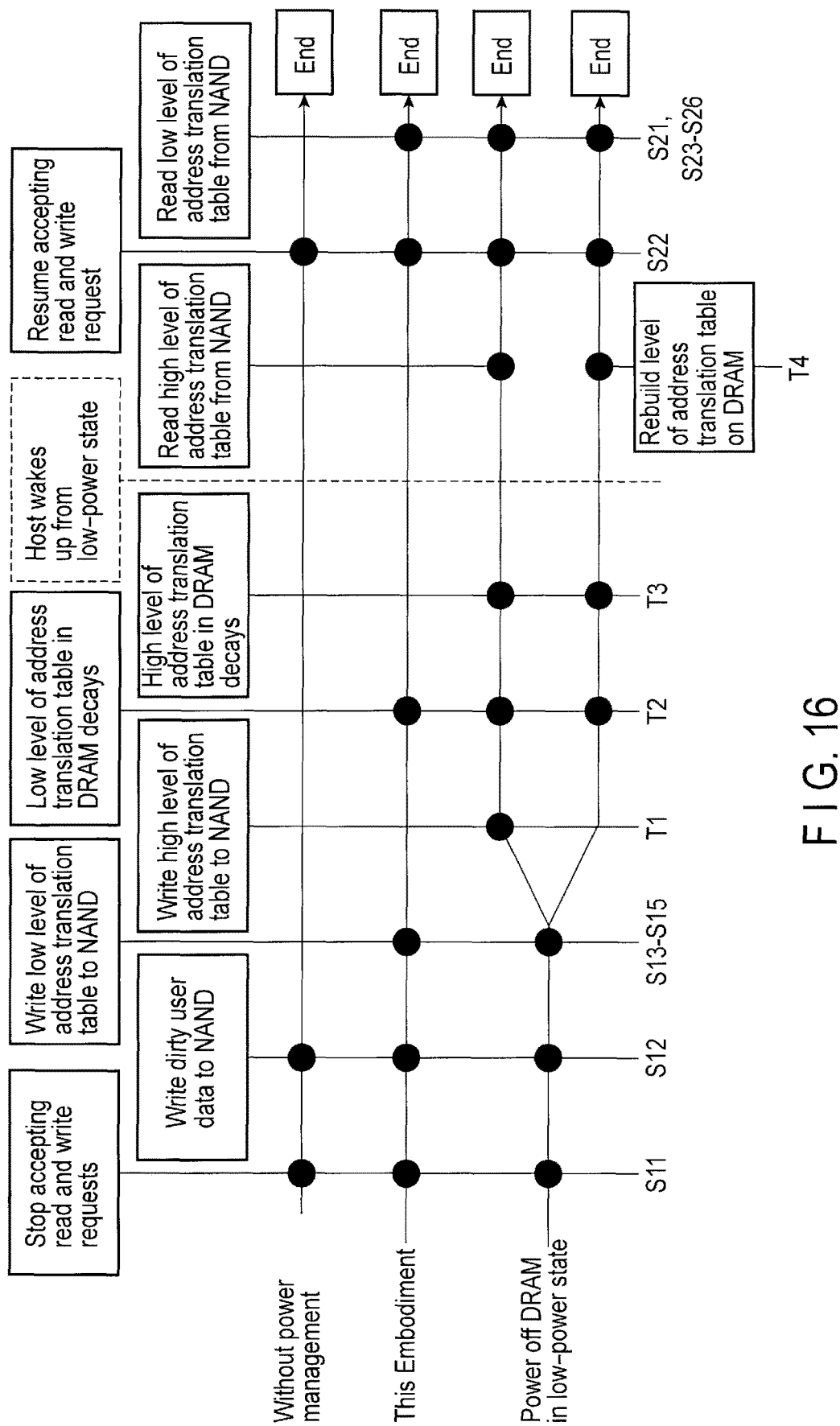
FIG. 16 shows the technique of the embodiment and a general technique as a comparative example.

FIG. 16 shows processing performed when the supply of power to the DRAM 15 is not shut off, i.e., when low-power control is not performed, and processing performed when the supply of power to the DRAM 15 is completely shut off. In FIG. 16, elements similar to those shown in FIGS. 13 and 14 are denoted by corresponding reference numbers. In FIG. 16, marks "•" indicate the cases where respective processes are performed.

As is evident from FIG. 16, when no low-power control is performed, processing in steps S13 to S15 of the embodiment is not needed for a transition to the low-power state, and when the device is restored from the low-power state, processing in steps S21 to S26 of the embodiment is not needed. Accordingly, the time required for return from the low-power state is shorter than in the embodiment, and the consumption of power is greater than in the embodiment.

Further, the consumption of power is less than the embodiment when the power to the DRAM 15 is completely shut off. However, writing the high level of the address translation table, as shown in Ti is additionally needed when the device is transited to the low-power state, compared to the embodiment. Also, when the device is returned from the low-power state, reading the high level of the address translation table 15a from the NAND 17 as shown in T4, or a step of reconstructing the high level of the address translation table 15a is additionally needed, compared to the embodiment. This requires a longer time for the return from the low-power state, than in the embodiment, which makes it difficult to quickly respond to the host 21.

As described above, in the embodiment, when the device is transited to the low-power state, the power required for it can be reduced, while when the device is returned from the low-power state, it can quickly respond to the host 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory having a plurality of physical blocks, and each of the physical blocks being an erasure unit;
   a volatile memory including a first area and a second area, the volatile memory being a single memory device to which a supply of power is configured to be shut off either to the first area or the second area selectively, and the first area and the second area being capable of being refreshed selectively; and
   a controller circuit configured to translate a logical address of write data supplied from a host into a physical address to access the nonvolatile memory on the basis of an address translation table, the address translation table being configured to translate the logical address into the physical address, and including first data and second data, the first data indicating positions in the nonvolatile memory in which the second data are stored, the second data indicating positions in the nonvolatile memory in which data are stored,
   wherein the controller circuit is configured to store the first data of the address translation table in the first area of the volatile memory, to store the second data of the address translation table in the second area of the volatile memory, to refresh the first area and the second area of the volatile memory during a first power mode, and to refresh only the first area of the volatile memory during a second power mode, wherein the first data correspond to upper bits of the logical address of the write data and the second data correspond to lower bits of the logical address of the write data, and
   wherein the power is supplied to the first area and the second area during the first power mode, and the power is supplied to the first area during the second power mode.

2. The system according to claim 1, wherein the first area and the second area correspond to memory cell arrays contained in the single memory device, which is configured to shut off power only to the second area of the volatile memory during the second power mode.

3. The system according to claim 1, wherein the controller circuit shuts off the supply of power to the second area of the volatile memory on the basis of a transition from the first power mode to the second power mode.

4. The system according to claim 1, wherein the first power mode is a normal power state, and the second power mode is a low power state.

5. The system according to claim 4, wherein
   a part of the second data of the address translation table that have most recently been used are assigned a higher priority; and
   the controller circuit is further configured to store the part of the second data of the address translation table with higher priority in the first area of the volatile memory.

6. The system according to claim 5, wherein
   the controller circuit is further configured to store the part of the second data of the address translation table with higher priority in the first area of the volatile memory during the second power mode.

7. The system according to claim 1, wherein the controller circuit is further configured to store a part of the second data of the address translation table in the first area of the volatile memory.

8. The system according to claim 1, further comprising:
   a first table indicating correspondence between a logical block and a plurality of groups of physical blocks in the nonvolatile memory, the logical block indicating the groups of physical blocks; and
   a valid data amount table holding data indicative of a valid data amount in the logical block,
   wherein the controller circuit is further configured to store, in the first area of the volatile memory, at least one of the first table and the valid data amount table.

9. The system according to claim 1, further comprising a second table indicating defective portions in the nonvolatile memory,
wherein
the second table includes first data and second data, the first data of the second table indicating positions in the nonvolatile memory and the volatile memory in which the second data of the second table are stored; and
the controller circuit is further configured to store the first data of the second table in the first area of the volatile memory.

10. The system according to claim 9, wherein
the second data of the second table that have most recently been used are assigned a higher priority; and
the controller circuit is further configured to store the second data of the second table with higher priority in the first area of the volatile memory.

11. The system according to claim 10, wherein
the controller circuit is further configured to store the second data of the second table with higher priority in the first area of the volatile memory during the second power mode.

12. The system according to claim 9, wherein the controller circuit is further configured to store data with higher priority in the first area of the volatile memory,
wherein data indicating the defective portions of the nonvolatile memory used to store the second data of the address translation table has higher priority compared to data indicating the defective portions of the nonvolatile memory used to store user data.

13. The system according to claim 9, wherein when the host requests a transition to the second power mode, or when the host does not issue a request to read user data for a predetermined period of time, the controller circuit is further configured to store in the first area of the volatile memory,
data indicative of a defective portion of a physical block to which user data requested by the host is to be written,
data indicative of a defective portion of a physical block to which user data is moved by garbage collection and is to be written, and
data indicative of a defective portion of a physical block to which the address translation table is to be written.

14. The system according to claim 1, wherein the controller circuit is further configured to transition to the second power mode when there is no data access request from the host for a predetermined period of time.

15. The system according to claim 1, wherein the controller circuit is further configured to transition to the second power mode in response to a host request.

16. The system according to claim 1, further comprising a second table, the second table including first data and second data, the first data of the second table being stored in the first area of the volatile memory and indicating positions in the nonvolatile memory and the volatile memory in which the second data of the second table is stored, the second data of the second table indicating defective portions in the nonvolatile memory,
the nonvolatile memory comprises:
a first area;
a second area; and
a third area,
wherein
the first area of the nonvolatile memory storing at least user data;
the defective portions in the first area of the nonvolatile memory are indicated by the second data of the second table, and the second area of the nonvolatile memory stores the second data of the second table; and
the defective portions in the second area of the nonvolatile memory are indicated by the first data of the second table, and the third area of the nonvolatile memory stores the first data of the second table.

17. The system according to claim 1, wherein the controller circuit is further configured to store, in the first area of the volatile memory, data indicative of a state of garbage collection during the second power mode.

18. The system according to claim 1, wherein when the supply of power from an external power supply is shut off, the controller circuit is further configured to shut off the supply of power to the second area of the volatile memory that stores data already stored in the nonvolatile memory.

19. A memory system comprising:
a nonvolatile memory having a plurality of physical blocks, and each of the physical blocks being an erasure unit;
a first circuit configured to receive a read request and a write request of data designated by a logical address, from a host;
a volatile memory including a first area and a second area, the volatile memory being a single memory device to which a supply of power is configured to be shut off either to the first area or the second area selectively, and the first area and the second area being capable of being refreshed selectively; and
a second circuit configured to translate a logical address of write data into a physical address to access the nonvolatile memory on the basis of a request from the first circuit and an address translation table, the address translation table being configured to translate the logical address into the physical address, and including first data and second data, the first data indicating positions in the nonvolatile memory in which the second data are stored, the second data indicating positions in the nonvolatile memory in which data are stored,
wherein the second circuit is configured to store the first data of the address translation table in the first area of the volatile memory, to store the second data of the address translation table in the second area of the volatile memory, to refresh the first area and the second area of the volatile memory during a first power mode, and to refresh only the first area of the volatile memory during a second power mode, wherein the first data correspond to upper bits of the logical address of the write data and the second data correspond to lower bits of the logical address of the write data, and
wherein the power is supplied to the first area and the second area during the first power mode, and the power is supplied to the first area during the second power mode.

20. The system according to claim 19, wherein the first area and the second area correspond to memory cell arrays contained in the single memory device.

21. The system according to claim 19, wherein the second circuit is further configured to shut off the supply of power to the second area of the volatile memory on the basis of a transition from the first power mode to the second power mode.

22. The system according to claim 19, wherein the first power mode is a normal power state, and the second power mode is a low power state.

23. The system according to claim 22, wherein
a part of the second data of the address translation table that have most recently been used are assigned to a higher priority; and
the second circuit is further configured to store the part of the second data of the address translation table with higher priority in the first area of the volatile memory.

24. The system according to claim 23, wherein
the second circuit is further configured to store the part of the second data of the address translation table with higher priority during the second power mode.

25. The system according to claim 19, wherein the second circuit is further configured to store a part of the second data of the address translation table in the first area of the volatile memory.

26. The system according to claim 19, further comprising:
a first table indicating correspondence between a logical block and a plurality of groups of physical blocks in the nonvolatile memory, the logical block indicating a structure of the groups of physical blocks; and
a valid data amount table holding data indicative of a valid data amount in the logical block,
wherein the second circuit is further configured to store, in the first area of the volatile memory, at least one of the first table and the valid data amount table.

27. The system according to claim 19, further comprising a second table indicating defective portions in the nonvolatile memory,
wherein
the second table includes first data and second data, the first data of the second table indicating positions in the nonvolatile memory and the volatile memory in which the second data of the second table are stored; and
the second circuit is further configured to store the first data of the second table in the first area of the volatile memory.

28. The system according to claim 27, wherein
the second data of the second table that have most recently been used are assigned to a higher priority; and
the second circuit is further configured to store the second data of the second table with higher priority in the first area of the volatile memory.

29. The system according to claim 28, wherein
the second circuit is further configured to store the second data of the second table with higher priority in the first area of the volatile memory during the second power mode.

30. The system according to claim 27, wherein the second circuit is further configured to store data with higher priority in the first area of the volatile memory,
wherein data indicating the defective portions of the nonvolatile memory used to store the second data of the address translation table has higher priority compared to data indicating the defective portions of the nonvolatile memory used to store user data.

31. The system according to claim 27, wherein when the host requests a transition to the second power mode, or when the host does not issue a request to read user data for a predetermined period of time, the second circuit is further configured to store in the first area of the volatile memory,
data indicative of a defective portion of a physical block to which user data requested by the host is to be written,
data indicative of a defective portion of a physical block to which user data is moved by garbage collection and to be written, and
data indicative of a defective portion of a physical block to which the address translation table is to be written.

32. The system according to claim 19, wherein the second circuit is further configured to transition to the second power mode when there is no data access request from the host for a predetermined period of time.

33. The system according to claim 19, wherein the second circuit is further configured to transition to the second power mode in response to a host request.

34. The system according to claim 19, further comprising a second table, the second table including first data and second data, the first data of the second table being stored in the first area of the volatile memory and indicating positions in the nonvolatile memory and the volatile memory in which the second data of the second table is stored, the second data of the second table indicating defective portions in the nonvolatile memory,
the nonvolatile memory comprises:
a first area;
a second area; and
a third area,
wherein
the first area of the nonvolatile memory storing at least user data;
the defective portions in the first area of the nonvolatile memory are indicated by the second data of the second table, and the second area of the nonvolatile memory stores the second data of the second table; and
the defective portions in the second area of the nonvolatile memory are indicated by the first data of the second table, and the third area of the nonvolatile memory stores the first data of the second table.

35. The system according to claim 19, wherein the second circuit is further configured to store, in the first area of the volatile memory, data indicative of a state of garbage collection during the second power mode.

36. The system according to claim 19, wherein when the supply of power from an external power supply is shut off, the second circuit is further configured to shut off the supply of power to the second area of the volatile memory that stores data already stored in the nonvolatile memory.

37. A control method of a memory system based on an address translation table comprising:
translating a logical address of write data into a physical address to access a nonvolatile memory;
storing first data of the address translation table in a first area of a volatile memory;
storing second data of the address translation table in a second area of the volatile memory, the first data indicating positions in the nonvolatile memory in which the second data of the address translation table are stored, the second data indicating positions in the nonvolatile memory in which the write data are stored, the volatile memory being a single memory device to which a supply of power is configured to be shut off either to the first area or the second area selectively, the first area and the second area being capable of being refreshed selectively, and the first data corresponding to upper bits of the logical address of the write data and the second data corresponding to lower bits of the logical address of the write data;
refreshing the first area and a second area of the volatile memory during a first power mode; and
refreshing only the first area of the volatile memory during a second power mode,
wherein the power is supplied to the first area and the second area during the first power mode, and the power is supplied to the first area during the second power mode.

38. The method according to claim 37, wherein the first area and the second area correspond to memory cell arrays contained in the single memory device.

39. The method according to claim 37, further comprising:
shutting off the supply of power to the second area of the volatile memory on the basis of a transition from the first power mode to the second power mode.

40. The method according to claim 37, wherein the first power mode is a normal power state, and the second power mode is a low power state.

41. The method according to claim 37, further comprising:
storing a part of the second data of the address translation table in the first area of the volatile memory.

42. The method according to claim 37, further comprising:
storing, during the second power mode, at least one of a first table, a valid data amount table, and a second table, in the first area of the volatile memory, the first table indicating correspondence between a logical block and a plurality of groups of physical blocks in the nonvolatile memory, the logical block indicating a structure of the groups of physical blocks in the nonvolatile memory;

the valid data amount table holding data indicative of a valid data amount in the logical block; and the second table indicating defective portions of the nonvolatile memory, wherein the second table includes first data and second data, the first data of the second table indicating positions in the nonvolatile memory and the volatile memory in which the second data of the second table are stored.

\* \* \* \* \*